US012607948B2

(12) United States Patent
Yukikawa et al.

(10) Patent No.: US 12,607,948 B2
(45) Date of Patent: Apr. 21, 2026

(54) TONER, TONER PRODUCTION METHOD, TONER STORAGE UNIT, IMAGE FORMING APPARATUS, AND IMAGE FORMING METHOD

(71) Applicants: Masahiro Yukikawa, Kanagawa (JP); Akio Takei, Shizuoka (JP); Akinori Saito, Shizuoka (JP); Hideto Suzuki, Shizuoka (JP)

(72) Inventors: Masahiro Yukikawa, Kanagawa (JP); Akio Takei, Shizuoka (JP); Akinori Saito, Shizuoka (JP); Hideto Suzuki, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 487 days.

(21) Appl. No.: 18/181,953

(22) Filed: Mar. 10, 2023

(65) Prior Publication Data

US 2023/0305412 A1 Sep. 28, 2023

(30) Foreign Application Priority Data

Mar. 14, 2022 (JP) ................................ 2022-039082
Nov. 28, 2022 (JP) ................................ 2022-189603

(51) Int. Cl.
*G03G 9/08* (2006.01)
*G03G 9/087* (2006.01)

(52) U.S. Cl.
CPC ......... *G03G 9/0827* (2013.01); *G03G 9/0806* (2013.01); *G03G 9/0821* (2013.01); *G03G 9/08755* (2013.01)

(58) Field of Classification Search
CPC .. G03G 9/0827; G03G 9/0806; G03G 9/0821; G03G 9/08755
See application file for complete search history.

(56) References Cited

U.S. PATENT DOCUMENTS

| | | | | |
|---|---|---|---|---|
| 2010/0248110 A1 | 9/2010 | Taguchi et al. | | |
| 2013/0216944 A1* | 8/2013 | Shiba | G03G 9/0819 | 430/108.4 |
| 2014/0342282 A1* | 11/2014 | Tada | G03G 9/08755 | 430/117.4 |
| 2015/0212438 A1* | 7/2015 | Sakamoto | G03G 9/09392 | 430/108.22 |
| 2015/0212439 A1* | 7/2015 | Sakamoto | G03G 9/09335 | 430/108.22 |

(Continued)

FOREIGN PATENT DOCUMENTS

| | | |
|---|---|---|
| JP | 2003-177567 | 6/2003 |
| JP | 4894876 | 3/2012 |
| JP | 5006682 | 8/2012 |

OTHER PUBLICATIONS

U.S. Appl. No. 17/955,620, filed Sep. 29, 2022.
U.S. Appl. No. 17/982,521, filed Nov. 8, 2022.

*Primary Examiner* — David H Banh
(74) *Attorney, Agent, or Firm* — Grüneberg Global IP, PLLC

(57) ABSTRACT

A toner includes toner matrix particles containing resin and wax; and an external additive, wherein an average number of voids per toner is 5 or more and 10 or less per toner with a void diameter Φ (nm) of voids in the toner matrix particles being $500 \geq \Phi \geq 200$, as measured based on cross-sectional observation by a scanning electron microscope (SEM).

9 Claims, 2 Drawing Sheets

(56) References Cited

U.S. PATENT DOCUMENTS

| | | | | |
|---|---|---|---|---|
| 2019/0235402 | A1* | 8/2019 | Inoue | G03G 9/08797 |
| 2021/0063916 | A1 | 3/2021 | Takel et al. | |
| 2021/0116830 | A1 | 4/2021 | Takel et al. | |
| 2021/0356877 | A1 | 11/2021 | Kamada et al. | |
| 2022/0050395 | A1 | 2/2022 | Yamada et al. | |
| 2022/0137525 | A1 | 5/2022 | Yoshida et al. | |
| 2022/0291602 | A1 | 9/2022 | Kamada et al. | |
| 2022/0373909 | A1* | 11/2022 | Tomita | G03G 15/06 |
| 2023/0014605 | A1 | 1/2023 | Saitoh et al. | |

* cited by examiner

TONER, TONER PRODUCTION METHOD, TONER STORAGE UNIT, IMAGE FORMING APPARATUS, AND IMAGE FORMING METHOD

CROSS-REFERENCE TO RELATED APPLICATION

The present application is based on and claims priority under 35 U.S.C. § 119 to Japanese Patent Application No. 2022-039082, filed on Mar. 14, 2022, and Japanese Patent Application No. 2022-189603, filed on Nov. 28, 2022, the contents of which are incorporated herein by reference in their entirety.

BACKGROUND OF THE INVENTION

1. Field of the Invention

The disclosures discussed herein relate to toner, a toner production method, a toner storage unit, an image forming apparatus, and an image forming method.

2. Description of the Related Art

Electrophotographic image formation typically requires transferring an appropriate amount of charged toner to a development area, and properly replenishing the toner consumed by development to stably obtain a good image. That is, the electrophotographic image formation requires improved transferability and replenishment properties of toner. Toner is generally known to include an external additive attached to matrix particles. External additives in toner are known to improve toner flowing stability, in addition to the above-described transferability and replenishment properties of toner.

Japanese Patent No. 4894876 (Patent Document 1), for example, proposes a toner that includes, as external additives, amorphous particles, which are formed by merging multiple primary particles and the surfaces of toner matrix particles. Patent Document 1 describes that the use of amorphous particles as an external additives prevents embedding and detachment of the external additives, which can prevent the toner from decreasing its flowability and from aggregating, thereby preventing clogging in the transport path.

However, in the technology described in Patent Document 1, the surface shapes of the toner matrix particles are distorted by the amorphous external additive particles, which may excessively increase the adhesive force between toner particles, and may lower the transferability. Thus, the related art technology may fail to satisfy both transferability and toner replenishment properties.

RELATED ART DOCUMENT

[Patent Document 1] Japanese Patent No. 4894876

SUMMARY OF THE INVENTION

Problems to be Solved by Invention

It may be desirable to provide a toner with excellent transferability and replenishment properties, and capable of forming good images.

Means to Solve Problems

One aspect of an embodiment of the present invention provides a toner that includes:

toner matrix particles containing resin and wax; and an external additive, wherein an average number of voids per toner is 5 or more and 10 or less per toner with a void diameter Φ (nm) of voids in the toner matrix particles being $500 \geq \Phi \geq 200$, as measured based on cross-sectional observation by a scanning electron microscope (SEM).

DETAILED DESCRIPTION OF THE PREFERRED EMBODIMENTS

Figure 1:
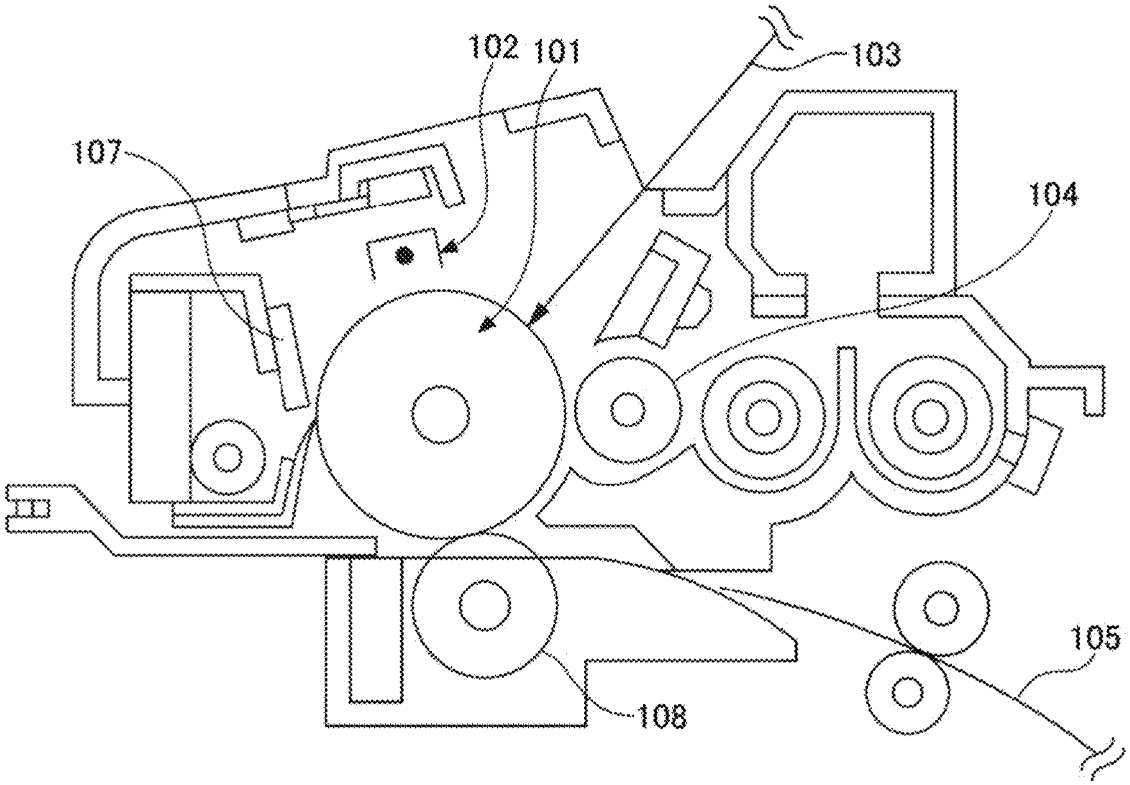
FIG. 1 is a schematic diagram illustrating an example of a process cartridge according to an embodiment.

Embodiments of the present invention will be described below with reference to the accompanying drawings. It should be noted that the present invention is not limited to the following embodiments, but other embodiments, additions, modifications, deletions, and the like can be made to the extent that those skilled in the art are able to conceive, and any of these forms will be included in the scope of the invention as long as the action and effect of the invention are achieved.

(Toner)

A toner according to the present embodiment includes a predetermined number of voids with a predetermined void diameter in the toner matrix particles. More specifically, in the toner according to the present embodiment, the average number of voids per toner is 5 or more and 10 or less per toner, where the void diameter Φ (nm) of voids in the toner matrix particles is $500 \geq \Phi \geq 200$, as measured based on cross-sectional observation by a scanning electron microscope (SEM).

In general, in order to improve the transferability of a toner, it is necessary to reduce the adhesive force of toner. It is desirable that the toner shape is closer to a spherical shape in order to reduce the adhesive force. However, the closer the shape of the toner is to a spherical shape, the higher the looseness of its apparent density, which may lead, in some cases, failing to ensure sufficient flowability. If sufficient flowability is not ensured, toner replenishment properties (or toner transportability) deteriorates, and the charge buildup performance of toner or developer deteriorates, resulting in images with uneven image density or causing the toner to scatter inside the machine, which is not desirable. In other words, there is a trade-off between transferability and toner replenishment properties. Therefore, even when further improvement in transferability is required, a toner excellent in toner replenishment properties has been required.

On the other hand, as a result of diligent investigation, the inventors found that by setting the average number of voids per toner at 5 or more and 10 or less per toner, where the void diameter Φ (nm) of voids in the toner matrix particles is $500 \geq \Phi \geq 200$, as measured based on cross-sectional observation by a scanning electron microscope (SEM), the looseness of its apparent density can be optimized while retaining the transferability, and thus the transferability and toner replenishment properties can both be achieved.

In recent years, small-diameter toner or spherically-shaped toner has been used to improve image quality. Such toners have excellent transferability but are prone to aggregation and adhesion in the transport path. However, according to the present embodiment, even such a small diameter or spherically-shaped toner can ensure transportability and replenishment properties, so that high image quality can also be obtained.

<Toner Matrix Particles>

Toner matrix particles (hereinafter also referred to as "toner matrix" and "matrix particle") contain a binder resin, a colorant, and wax, and, if necessary, other components.

<<Binder Resins>>

The binder resins are not particularly limited and can be selected appropriately according to different purposes; examples of the binder resins include polyester resin, styrene-acrylic resin, polyol resin, vinyl-based resin, polyurethane resin, epoxy resin, polyamide resin, polyimide resin, silicon-based resin, phenol resin, melamine resin, urea resin, aniline resin, ionomer resin, polycarbonate resin, etc. Among these, polyester resin is preferable because it can give flexibility to the toner. These examples may be used alone or in combination of two or more.

<<<Polyester Resins>>>

The polyester resins are not particularly limited and can be selected appropriately according to different purposes; examples of the polyester resins include crystalline polyester resins, amorphous polyester resins, modified polyester resins, etc. These examples may be used alone or in combination of two or more.

-Crystalline Polyester Resins-

The crystalline polyester resins (Hereafter also referred to as "crystalline polyesters" and "polyester resin components") are not particularly limited and can be selected appropriately according to different purposes; examples of the crystalline polyester resins include a crystalline polyester resin obtained by reacting a polyol with a polycarboxylic acid, etc.

Crystalline polyester resins have high crystallinity and therefore exhibit thermal melting properties that exhibit a sharp drop in viscosity near the fixing start temperature. The use of such a crystalline polyester resin having these properties in combination with an amorphous polyester resin described below will provide good heat resistant preservability until just before the melting start temperature due to its crystallinity, and cause a rapid drop in viscosity (sharp melt) at the melting start temperature due to the melting of the crystalline polyester resin, which allows the toner to be miscible with the amorphous polyester resin, and to be fixed according to a rapid drop in viscosity. Thus, it is possible to provide a toner that exhibits both good heat resistant preservability and low temperature fixability. The release width (the difference between the low limit fixing temperature and the high temperature offset resistance temperature) also exhibits good results.

In this specification, crystalline polyester resins indicate those resins obtained by reacting polyols with polycarboxylic acids as described above, but do not indicate those resins obtained by modifying polyester resins, such as prepolymers described later and those resins obtained by cross-linking and/or elongation reaction of such prepolymers.

—Polyols—

Polyols used in the synthesis of crystalline polyester resins are not particularly limited and can be selected appropriately according to different purposes; examples of the polyols include diols, trivalent or higher valent alcohols, etc.

Examples of the diols used for the synthesis of crystalline polyester resins include saturated aliphatic diols. The saturated aliphatic diols include, for example, straight-chain saturated aliphatic diols, branched saturated aliphatic diols, etc. Among these, straight-chain saturated aliphatic diols are preferable, and straight-chain saturated aliphatic diols with a carbon number of 2 or more and 12 or less are more preferable, because these examples can improve crystallinity and prevent lowering of the melting point. These examples may be used alone or in combination of two or more.

Specific examples of saturated aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanediol, etc. Among these, ethylene glycol, 1,4-butanediol, 1,6-hexanediol, 1,8-octanediol, 1,10-decanediol, and 1,12-dodecanediol are preferable because of their high crystallinity and excellent sharp-melt performance.

Examples of trivalent or higher valent alcohols used in the synthesis of crystalline polyester resins include glycerin, trimethylolethane, trimethylolpropane, pentaerythritol, etc.

—Polycarboxylic Acids—

Polycarboxylic acids used for the synthesis of crystalline polyester resins are not particularly limited and can be selected appropriately according to different purposes; examples of the polycarboxylic acids include divalent carboxylic acids, trivalent or higher valent carboxylic acids, etc.

Examples of the divalent carboxylic acids used in the synthesis of crystalline polyester resins include saturated aliphatic dicarboxylic acids such as oxalic acid, succinic acid, glutaric acid, adipic acid, speric acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, 1,18-octadecanedicarboxylic acid, etc.; aromatic dicarboxylic acids such as phthalic acid, isophthalic acid, terephthalic acid, naphthalene-2,6-dicarboxylic acid, malonic acid, and dibasic acids such as mesaconic acid, etc.; and their anhydrides and their lower (a carbon number of 1 to 3) alkyl esters, etc.

Examples of the trivalent or higher valent carboxylic acids used in the synthesis of crystalline polyester resins include 1,2,4-benzenetricarboxylic acid, 1,2,5-benzenetricarboxylic acid, 1,2,4-naphthalenetricarboxylic acid, their anhydrides and their lower (a carbon number of 1 to 3) alkyl esters.

Examples of the polycarboxylic acid used for the synthesis of the crystalline polyester resin include dicarboxylic acid having a sulfonic acid group, dicarboxylic acid having a double bond, etc., in addition to saturated aliphatic dicarboxylic acid and aromatic dicarboxylic acid.

The above carboxylic acids may be used alone or in combination of two or more.

The crystalline polyester resin is preferably composed of a straight-chain saturated aliphatic dicarboxylic acid with a carbon number of 4 or more and 12 or less, and a straight-chain saturated aliphatic diol with a carbon number of 2 or more and 12 or less. That is, the crystalline polyester resin preferably has a structural unit derived from saturated aliphatic dicarboxylic acid with a carbon number of 4 or more and 12 or less, and a structural unit derived from saturated aliphatic diol with a carbon number of 2 or more and 12 or less. By designing the crystalline polyester resin as described above, it is preferable that excellent low temperature fixability can be exerted because of its high crystallinity and excellent sharp-melt performance.

The presence or absence of crystallinity of the crystalline polyester resin in the toner according to the present embodiment can be verified by a crystal analysis X-ray diffractometer (e.g., the X'Pert Pro MRD, manufactured by Philips). The measurement method is described below.

First, the target sample is ground using a mortar to prepare a sample powder, and the resulting sample powder is uniformly applied to a sample holder. Then, the sample holder is set in the diffractometer, measurements are made, and a diffraction spectrum is obtained. Then, in the obtained diffraction spectrum, if the peak half width of the peak with the highest peak intensity among the peaks obtained in the range of 20 degrees<2θ<25 degrees is 2.0 or less, it can be judged that the crystal polyester resin is present. In contrast to the crystalline polyester resin, a polyester resin that does not exhibit the above condition is referred to herein as an amorphous polyester resin.

Examples of the measurement conditions for X-ray diffraction are described below.

-Measurement Conditions-

Tension kV: 45 kV
Current: 40 mA
MPSS
Upper
Gonio
Scanmode: continuous
Start angle: 3°
End angle: 35°
Angle Step: 0.02°
Lucident beam optics
Divergence slit: Div slit ½
Deflection beam optics
Anti scatter slit: As Fixed ½
Receiving slit: Prog rec slit The melting point of the crystalline polyester resin is not particularly limited and can be selected appropriately according to different purposes. The melting point is preferably between 60° C. or higher and 80° C. or lower. When the melting point of the crystalline polyester resin is 60° C. or higher, the crystalline polyester resin is easy to melt at low temperatures, and the defect such as the deterioration of the heat resistant preservability of the toner can be prevented, and when the melting point is 80° C. or lower, the defect such as the deterioration of the low temperature fixability caused by insufficient melting by heating the crystalline polyester resin during fixing can be prevented.

The molecular weight of the crystalline polyester resin is not particularly limited and can be selected appropriately according to different purposes. The weight-average molecular weight (Mw) of the soluble part of o-dichlorobenzene in crystalline polyester resin in GPC measurement using o-dichlorobenzene as a solvent is preferably 3,000 to 30,000 and more preferably 5,000 to 15,000.

In addition, the number-average molecular weight (Mn) of the soluble part of o-dichlorobenzene in crystalline polyester resin in GPC measurement using o-dichlorobenzene as a solvent is preferably 1,000 to 10,000 and more preferably 2,000 to 10,000.

The ratio of molecular weight (Mw/Mn) of the crystalline polyester resin is preferably 1.0 to 10 and more preferably 1.0 to 5.0. This is because those with a sharp molecular weight distribution and low molecular weight have excellent low temperature fixability, and those with large amounts of low molecular weight components lower heat resistant preservability.

The acid value of the crystalline polyester resin is not particularly limited and can be selected appropriately according to different purposes; however, in order to achieve the desired low temperature fixability from the viewpoint of the affinity between paper and resin, 5 mg KOH/g or more is preferable, and 10 mg KOH/g or more is more preferable. On the other hand, in order to improve high temperature offset resistance, 45 mg KOH/g or less is preferable.

The hydroxyl value of the crystalline polyester resin is not particularly limited and can be selected appropriately according to different purposes; however, in order to achieve the desired low temperature fixability and to achieve good charging characteristics, 0 mg KOH/g to 50 mg KOH/g is preferable and 5 mg KOH/g to 50 mg KOH/g is more preferable.

The molecular structure of crystalline polyester resins can be verified by NMR measurements in a solutions or solid, as well as X-ray diffraction, GC/MS, LC/MS, IR measurements, etc. Conveniently, in the infrared absorption spectrum, a method for detecting an olefin having an absorption at 965±10 $cm^{-1}$ or 990±10 $cm^{-1}$ based on the δCH (out-of-plane bending vibration) of the olefin as a crystalline polyester resin can be mentioned.

The content of the crystalline polyester resin is not particularly limited and can be selected appropriately according to different purposes; however, with respect to 100 parts by mass of toner, 3 to 20 parts by mass is preferable, and 5 to 15 parts by mass is more preferable. When the content of the crystalline polyester resin is 3 parts by mass or more, deterioration of low temperature fixability due to insufficient sharp melting by the crystalline polyester resin can be prevented. When the content of the crystalline polyester resin is 20 parts by mass or less, defects such as a decrease in heat resistant preservability or an increase in image blurring can be prevented.

-Amorphous Polyester Resins-

The amorphous polyester resins (Hereafter, sometimes referred to as "amorphous polyester", "amorphous polyester", "amorphous polyester resin", "unmodified polyester resin", and "polyester resin component A") are not particularly limited and can be selected appropriately according to different purposes; examples of the amorphous polyester resins include an amorphous polyester resin obtained by reacting a polyol with a polycarboxylic acid, etc.

In this specification, amorphous polyester resins indicate those resins obtained by reacting polyols with polycarboxylic acids, as described above. That is, those resins obtained by modifying polyester resin, such as a prepolymer described later and those resins obtained by crosslinking and/or elongating the prepolymer are not included in the amorphous polyester resins but are treated as modified polyester resins.

The amorphous polyester resin may be a polyester resin component soluble in tetrahydrofuran (THF). The amorphous polyester resin is preferably a linear polyester resin.

—Polyols—

Examples of polyols used in the synthesis of amorphous polyester resins include diols and the like. Examples of the diols used in the synthesis of amorphous polyester resins include alkylene (a carbon number of 2 to 3) oxide (average addition mole number 1 to 10) adducts of bisphenol A such as polyoxypropylene (2.2)-2,2-bis(4-hydroxyphenyl) propane, polyoxyethylene (2.2)-2,2-bis(4-hydroxyphenyl) propane, etc.; ethylene glycol, propylene glycol; hydrogenated bisphenol A, alkylene (a carbon number of 2 to 3) oxide (average addition molar number of 1 to 10) adducts of hydrogenated bisphenol A, etc. Among these, the polyol preferably contains 40 mol % or more of alkylene glycol. These examples may be used alone or in combination of two or more.

—Polycarboxylic Acids—

Examples of polycarboxylic acids used in the synthesis of amorphous polyester resins include dicarboxylic acids, etc. Examples of the dicarboxylic acids used in the synthesis of amorphous polyester resins include alkyl groups with a carbon number of 1 to 20 such as adipic acid, phthalic acid, isophthalic acid, terephthalic acid, fumaric acid, maleic acid, dodecenylsuccinic acid, and octylsuccinic acid; succinic acid substituted with an alkenyl group with a carbon number of 2 to 20; etc. Among these, the polycarboxylic acid preferably contains 50 mol % or more of terephthalic acid. These examples may be used alone or in combination of two or more.

The amorphous polyester resin may contain a trivalent or higher valent carboxylic acid and/or a trivalent or higher valent alcohol, a trivalent or higher valent epoxy compound, etc., at the end of the resin chain in the amorphous polyester resin in order to adjust the acid value and hydroxyl value. Among these, it is preferable that the amorphous polyester resin contain a trivalent or higher valent aliphatic alcohol, from the viewpoint of preventing unevenness and obtaining sufficient gloss and image density.

Examples of the trivalent or higher valent carboxylic acids in the amorphous polyester resin include trimellitic acid, pyromellitic acid, or their anhydrides. Examples of the trivalent or higher valent alcohols in the amorphous polyester resin include glycerin, pentaerythritol, trimethylolpropane, etc.

The molecular weight of the amorphous polyester resin is not particularly limited and can be selected appropriately according to different purposes; however, the molecular weight of the amorphous polyester resin preferably falls within the following ranges. The weight-average molecular weight (Mw) of the amorphous polyester resin is preferably in the range of 3,000 to 10,000 and more preferably in the range of 4,000 to 7,000. The number-average molecular weight (Mn) of the amorphous polyester resin is preferably in the range of 1,000 to 4,000 and more preferably in the range of 1,500 to 3,000. The ratio of the molecular weight (Mw/Mn) of the amorphous polyester resin is preferably in the range of 1.0 to 4.0 and more preferably in the range of 1.0 to 3.5.

The reason why the weight-average molecular weight (Mw) and the number-average molecular weight (Mn) are preferably in the above ranges is that when the weight-average molecular weight (Mw) is 3,000 or more or the number-average molecular weight (Mn) is 1,000 or more, the deterioration in the heat resistant preservability and durability of the toner against stresses such as stirring in the developing machine can be prevented, and when the weight-average molecular weight (Mw) is 10,000 or less or the number-average molecular weight (Mn) is 4,000 or less, the deterioration in low temperature fixability can be prevented by an increase in viscoelasticity of the toner during melting.

The weight-average molecular weight (Mw) and the number-average molecular weight (Mn) can be determined, for example, by GPC (gel permeation chromatography).

The component with a molecular weight of 600 or less in the amorphous polyester resin (THF-soluble component) is preferably 2 mass % to 10 mass %. When a component with a molecular weight of 600 or less in the amorphous polyester resin (THF-soluble component) is 10 mass % or less, poor heat resistant preservability and poor durability against stress such as stirring in a developing machine can be prevented. In addition, when the component with a molecular weight of 600 or less in the amorphous polyester resin (THF-soluble component) is 2 mass % or more, disadvantageous effects such as poor low temperature fixability can be removed.

As a method for controlling the content of a component with a molecular weight of 600 or less in the amorphous polyester resin (THF-soluble component), methods such as a method of extracting the amorphous polyester resin with methanol, removing the component with a molecular weight of 600 or less, and refining the resulting product may be given.

The acid value of the amorphous polyester resin is not particularly limited and can be selected appropriately according to different purposes; however, the acid value of the amorphous polyester resin is preferably 1 mg KOH/g to 50 mg KOH/g, and more preferably 5 mg KOH/g to 30 mg KOH/g. When the acid value of the amorphous polyester resin is 1 mg KOH/g or more, the toner tends to become negatively charged, and furthermore, the affinity between the paper and the toner at the time of fixing the toner to paper improves the low temperature fixability. When the acid value of the amorphous polyester resin is 50 mg KOH/g or less, the defect such as a decrease in charging stability, especially a decrease in charging stability against environmental change can be prevented.

The hydroxyl value of the amorphous polyester resin is not particularly limited and can be selected appropriately according to different purposes; however, the hydroxyl value of the amorphous polyester resin is preferably 5 mg KOH/g or more.

The glass transition temperature (Tg) of the amorphous polyester resin is preferably 40° C. to 65° C., more preferably 45° C. to 65° C., and still more preferably 50° C. to 60° C. When the Tg of the amorphous polyester resin is 40° C. or higher, the heat resistant preservability of the toner and the durability against stress such as stirring in the developing machine are improved, and the film resistance is also improved. When the Tg of the amorphous polyester resin is 65° C. or lower, the deformation due to heating and pressurization during the fixing of the toner becomes good, which is suitable for improving low temperature fixability.

The content of the amorphous polyester resin is preferably 80 to 90 parts by mass per 100 parts by mass of the toner such that the toner can be obtained with both low temperature fixability and heat resistant preservability.

-Modified Polyester Resins-

The modified polyester resins (Hereafter, sometimes referred to as "modified polyesters" or "polyester resin components") are not particularly limited and can be selected appropriately according to different purposes; examples of the modified polyester resins include a reaction product of an active hydrogen group-containing compound and a polyester resin (hereinafter sometimes referred to as "prepolymer" or "polyester prepolymer") having a site capable of reacting with the active hydrogen group-containing compound.

The modified polyester resins are polyester resins insoluble in tetrahydrofuran (THE). The polyester resin component, which is insoluble in tetrahydrofuran (THF), reduces Tg and melt viscosity, ensures low temperature fixability, and has a branched structure in the molecular framework, which allows the molecular chain to form a three-dimensional mesh structure, thereby giving a rubbery property that deforms at low temperatures but does not flow.

Since the modified polyester resin has active hydrogen group-containing compounds and sites that can react with active hydrogen group-containing compounds, these sites behave like pseudo-crosslinking points, and the rubbery properties of the amorphous polyester resin become stronger, enabling the production of toners with excellent heat resistant preservability and high temperature offset resistance.

—Active Hydrogen Group-Containing Compounds—

Active hydrogen group-containing compounds are compounds that react with polyester resins having sites that can react with active hydrogen group-containing compounds.

The active hydrogen groups are not particularly limited and can be selected appropriately according to different purposes; examples of the active hydrogen groups include a hydroxyl group (an alcoholic hydroxyl group and a phenolic hydroxyl group), an amino group, a carboxyl group, a mercapto group, etc. These examples may be used alone or in combination of two or more.

The active hydrogen group-containing compounds are not particularly limited and can be selected appropriately according to different purposes; however, amines are preferable when the polyester resin having a site that can react with an active hydrogen group-containing compound is a polyester resin containing isocyanate groups. When the active hydrogen group-containing compounds are amines, the molecular weight of polyester resins can be increased through elongation and cross-linking reactions with polyester resins.

The amines are not particularly limited and can be selected appropriately according to different purposes; examples of the amines include diamines, trivalent or higher valent amines, amino alcohols, aminomercaptans, amino acids, and those obtained by blocking amino groups. Among these, diamines and mixtures of diamines and small amounts of trivalent or higher amines are preferable. These examples may be used alone or in combination of two or more.

The diamines are not particularly limited and can be selected appropriately according to different purposes; examples of the diamines include aromatic diamines, alicyclic diamines, aliphatic diamines, etc.

The aromatic diamines are not particularly limited and can be selected appropriately according to different purposes; examples of the aromatic diamines include phenylenediamine, diethyltoluenediamine, 4,4'-diaminodiphenylmethane, etc. The alicyclic diamines are not particularly limited and can be selected appropriately according to different purposes; examples of the alicyclic diamines include 4,4'-diamino-3,3'-dimethyldicyclohexylmethane, diaminocyclohexane, isophorone diamine, etc. The aliphatic diamines are not particularly limited and can be selected appropriately according to different purposes; examples of the aliphatic diamines include ethylenediamine, tetramethylenediamine, hexamethylenediamine, etc.

The trivalent or higher amines are not particularly limited and can be selected appropriately according to different purposes; examples of the trivalent or higher valent amines include diethylenetriamine, triethylenetetramine, etc.

The amino alcohols are not particularly limited and can be selected appropriately according to different purposes; examples of the amino alcohols include ethanolamine, hydroxyethylaniline, etc.

The aminomercaptans are not particularly limited and can be selected appropriately according to different purposes; examples of the aminomercaptans include aminoethylmercaptan, aminopropylmercaptan, etc.

The amino acids are not particularly limited and can be selected appropriately according to different purposes; examples of the amino acids include aminopropionic acid, aminocaproic acid, etc.

Those obtained by blocking amino groups are not particularly limited and can be selected appropriately according to different purposes; examples of those obtained by blocking amino groups include ketimine compounds, oxazolizone compounds, and the like that are obtained by blocking amino groups with ketones such as acetone, methyl ethyl ketone and methyl isobutyl ketone.

—Polyester Resins Having Sites Reactive with Active Hydrogen Group-Containing Compounds—

The polyester resins having a site that can react with active hydrogen group-containing compounds are not particularly limited and can be selected appropriately according to different purposes; examples of the polyester resins having a site reactive with active hydrogen group-containing compounds include polyester resins containing isocyanate groups (Hereafter, it is sometimes referred to as "polyester prepolymer containing isocyanate groups").

The polyester resins containing the isocyanate groups are not particularly limited and can be selected appropriately according to different purposes; examples of the polyester resins containing the isocyanate groups include reaction products of a polyisocyanate with a polyester resin having an active hydrogen group obtained by polycondensation of a polyol and a polycarboxylic acid.

The polyols used for the synthesis of polyester resins containing isocyanate groups are not particularly limited and can be selected appropriately according to different purposes; examples of the polyols include diols, trivalent or higher valent alcohols, and mixtures of diols and trivalent or higher valent alcohols. Among these, a mixture of a diol, a diol and a small amount of a trivalent or higher valent alcohol is preferable. These examples may be used alone or in combination of two or more.

The diols used for the synthesis of polyester resins containing isocyanate groups are not particularly limited and can be selected appropriately according to different purposes; examples of the diols include chain-alkylene glycols, diols having oxyalkylene groups, alicyclic diols, bisphenols, alkylene oxide adducts of alicyclic diols, alkylene oxide adducts of bisphenols, etc.

Examples of the chain alkylene glycols include ethylene glycol, 1,2-propylene glycol, 1,3-propylene glycol, 1,4-butanediol, 1,6-hexanediol, etc. The carbon number of the chain alkylene glycols is not particularly limited and can be selected appropriately according to different purposes; however, the preferable carbon number of the chain alkylene glycols is, for example, 2 to 12. Among these, at least one of a chain alkylene glycol having a carbon number of 2 to 12 and the alkylene oxide adduct of bisphenols is preferable, and the alkylene oxide adduct of bisphenol, and a mixture of the alkylene oxide adduct of bisphenol and the chain alkylene glycol having a carbon number of 2 to 12 are more preferable.

Examples of the diols having an oxyalkylene groups include diethylene glycol, triethylene glycol, dipropylene glycol, polyethylene glycol, polypropylene glycol, polytetramethylene glycol, etc.

Examples of the alicyclic diols include 1,4-cyclohexanedimethanol, hydrogenated bisphenol A, etc.

Examples of the bisphenols include bisphenol A, bisphenol F, bisphenol S, etc.

Examples of alkylene oxide include ethylene oxide, propylene oxide, butylene oxide, etc.

The trivalent or higher valent alcohols used for the synthesis of polyester resins containing isocyanate groups are not particularly limited and can be selected appropriately according to different purposes; examples of the trivalent or higher valent alcohols include trivalent or higher valent aliphatic alcohols, trivalent or higher valent polyphenols, alkylene oxide adducts of trivalent or higher valent polyphenols, etc.

The trivalent or higher aliphatic alcohols are not particularly limited and can be selected appropriately according to different purposes; examples of the trivalent or higher aliphatic alcohols include glycerin, trimethylolethane, trimethylolpropane, pentaerythritol, sorbitol, etc.

The trivalent or higher valent polyphenols are not particularly limited and can be selected appropriately according to different purposes; examples of the trivalent or higher valent polyphenols include trisphenol PA, phenol novolac, cresol novolac, etc.

Alkylene oxide adducts of the trivalent or higher valent polyphenols include, for example, those in which an alkylene oxide such as ethylene oxide, propylene oxide, or butylene oxide is added to trivalent or higher valent polyphenols.

In the case of using a mixture of a diol and a trivalent or higher valent alcohol, the mass ratio of trivalent or higher valent alcohol to diol (trivalent or higher valent alcohol/diol) is not particularly limited and can be selected appropriately according to different purposes; however, the mass ratio of trivalent or higher valent alcohol to diol is preferably 0.01 mass % to 10 mass %, and is more preferably 0.01 mass % to 1 mass %.

The polycarboxylic acids used for the synthesis of polyester resins containing isocyanate groups are not particularly limited and can be selected appropriately according to different purposes; examples of the polycarboxylic acids used for synthesis of the polyester resins include dicarboxylic acids, trivalent or higher valent carboxylic acids, and mixtures of trivalent or higher valent dicarboxylic acids. Among these, dicarboxylic acids, and mixtures of dicarboxylic acids and a small amount of trivalent or higher valent polycarboxylic acid are preferable. One polycarboxylic acid may be used alone, or two or more polycarboxylic acids may be used in combination.

The dicarboxylic acids used for the synthesis of polyester resins containing isocyanate groups are not particularly limited and can be selected appropriately according to different purposes; examples of the dicarboxylic acids include divalent alkanoic acids, divalent alkenoic acids, aromatic dicarboxylic acids, etc.

The divalent alkanoic acids are not particularly limited and can be selected appropriately according to different purposes; examples of the divalent alkanoic acids include succinic acid, adipic acid, sebacic acid, etc. The divalent alkenoic acids with a carbon number of 4 to 20 are not particularly limited and can be selected appropriately according to different purposes; however, examples of the divalent alkenoic acids with a carbon number of 4 to 20 include maleic acids and fumaric acids, etc. The aromatic dicarboxylic acids are not particularly limited and can be selected appropriately according to different purposes; however, the aromatic dicarboxylic acids having a carbon number of 8 to 20 are preferable. The aromatic dicarboxylic acids with a carbon number of 8 to 20 are not particularly limited and can be selected appropriately according to different purposes; examples of the aromatic dicarboxylic acids with a carbon number of 8 to 20 include phthalic acids, isophthalic acids, terephthalic acids, naphthalenedicarboxylic acids, etc.

The trivalent or higher valent carboxylic acids used for the synthesis of polyester resins containing isocyanate groups are not particularly limited and can be selected appropriately according to different purposes; however, trivalent or higher valent aromatic carboxylic acids may be selected, for example. The trivalent or higher valent aromatic carboxylic acids are not particularly limited and can be selected appropriately according to different purposes; however, trivalent or higher valent aromatic carboxylic acids with a carbon number of 9 to 20 are preferable. The trivalent or higher valent aromatic carboxylic acids with a carbon number of 9 to 20 are not particularly limited and can be selected appropriately according to different purposes; examples of the trivalent or higher valent aromatic carboxylic acids with a carbon number of 9 to 20 include trimellitic acids and pyromellitic acids.

As the polycarboxylic acid used for the synthesis of polyester resins containing isocyanate groups, either an acid anhydride or a lower alkyl ester of dicarboxylic acid, a trivalent or higher valent carboxylic acid, and a mixture of dicarboxylic acid and a trivalent or higher valent carboxylic acid can also be used. The lower alkyl esters are not particularly limited and can be selected appropriately according to different purposes; examples of the lower alkyl esters include methyl ester, ethyl ester, isopropyl ester, etc.

When the mixture of a dicarboxylic acid and a trivalent or higher valent carboxylic acid is used, the mass ratio of the trivalent or higher valent carboxylic acid to the dicarboxylic acid (the trivalent or higher valent carboxylic acid/the dicarboxylic acid) is not particularly limited and can be selected appropriately according to different purposes; however, the mass ratio of the trivalent or higher valent carboxylic acid to the dicarboxylic acid is preferably 0.01 mass % to 10 mass %, and is more preferably 0.01 mass % to 1 mass %.

An equivalence ratio of a hydroxyl group of a polyol to a carboxyl group of a polycarboxylic acid in polycondensation of the polyol and the polycarboxylic acid (hydroxyl group of polyol/carboxyl group of polycarboxylic acid) is not particularly limited and can be selected appropriately according to different purposes; however, the equivalence ratio of the hydroxyl group of the polyol to the carboxyl group of the polycarboxylic acid is preferably 1 to 2, is more preferably 1 to 1.5, and is particularly preferably 1.02 to 1.3.

The content of the constituent units derived from polyols in a polyester prepolymer containing isocyanate groups is not particularly limited and can be selected appropriately according to different purposes; however, the content of the constituent units derived from polyols in a polyester prepolymer is preferably 0.5 mass % to 40 mass %, more preferably 1 mass % to 30 mass %, and particularly preferably 2 mass % to 20 mass %. When the above content is 0.5 mass % or more, difficulty in securing both the heat resistant preservability and the low temperature fixability of toner due to lowering of high temperature offset resistance can be removed, and when the above content is 40 mass % or less, lowering of low temperature fixability can be prevented.

The polyisocyanates are not particularly limited and can be selected appropriately according to different purposes; examples of the polyisocyanates include aliphatic diisocyanates, alicyclic diisocyanates, aromatic diisocyanates, aromatic aliphatic diisocyanates, isocyanurates, those blocked with phenolic derivatives, oximes, caprolactams, etc.

The aliphatic diisocyanates are not particularly limited and can be selected appropriately according to different purposes; examples of the aliphatic diisocyanates include tetramethylenediisocyanate, hexamethylenediisocyanate, methyl 2,6-diisocyanatocaproate, octamethylenediisocyanate, decamethylenediisocyanate, dodecamethylenediisocyanate, tetradecamethylenediisocyanate, trimethylhexanediisocyanate, tetramethylhexanediisocyanate, etc.

The alicyclic diisocyanates are not particularly limited and can be selected appropriately according to different purposes; examples of the alicyclic diisocyanates include isophorone diisocyanate, cyclohexyl methane diisocyanate, etc.

The aromatic diisocyanates are not particularly limited and can be selected appropriately according to different purposes; examples of the aromatic diisocyanates include tolylene diisocyanate, diisocyanatodiphenylmethane, 1,5-naphthylene diisocyanate, 4,4'-diisocyanato diphenyl, 4,4'-diisocyanato-3,3'-dimethyldiphenyl, 4,4'-diisocyanato-3-methyldiphenylmethane, 4,4'-diisocyanato-diphenyl ether, etc.

The aromatic aliphatic diisocyanates are not particularly limited and can be selected appropriately according to different purposes; however, examples of the aromatic aliphatic diisocyanates include a, a, a', a'-tetramethylxylylene diisocyanate, etc.

The isocyanurates are not particularly limited and can be selected appropriately according to different purposes; examples of the isocyanurates include tris(isocyanatoalkyl) isocyanurate, tris(isocyanatocycloalkyl) isocyanurate, etc.

The above polyisocyanates may be used alone or in combination of two or more.

The equivalence ratio (NCO/OH) of the isocyanate group of the polyisocyanate to the hydroxyl group of the polyester resin in reacting the polyisocyanate with the polyester resin having a hydroxyl group is not particularly limited, and an appropriate equivalence ratio can be selected according to different purposes; however, the equivalence ratio is preferably 1 to 5, more preferably 1.2 to 4, and particularly preferably 1.5 to 2.5. When the equivalence ratio is 1 or more, lowering of the high temperature offset resistance can be prevented, and when the equivalence ratio is 5 or less, lowering of the low temperature fixability can be prevented.

The content of the constituent units derived from polyisocyanates in a polyester prepolymer having isocyanate groups is not particularly limited and can be selected appropriately according to different purposes; however, the content of the constituent units is preferably 0.5 mass % to 40 mass %, is more preferably 1 mass % to 30 mass %, and is still more preferably 2 mass % to 20 mass %. When the content is 0.5 mass % or more, lowering of the high temperature offset resistance can be prevented, and when the content is 40 mass % or less, lowering of the low temperature fixability can be prevented.

The average number of isocyanate groups per molecule of a polyester prepolymer having isocyanate groups is not particularly limited and can be selected appropriately according to different purposes; however, the average number of isocyanate groups per molecule of the polyester prepolymer with isocyanate groups is preferably 1 or more, is more preferably 1.5 to 3, and is still more preferably 1.8 to 2.5. When the average number of isocyanate groups per molecule of the polyester prepolymer with isocyanate groups is 1 or more, lowering of the molecular weight of the modified polyester resin and lowering of the high temperature offset resistance decreases can be prevented.

The modified polyester resin can be produced by a one-shot process or the like. As an example, a method of producing a urea-modified polyester resin will be described below.

First, the polyol and the polycarboxylic acid are heated to 150° C. to 280° C. in the presence of a catalyst such as tetrabutoxytitanate or dibutyltin oxide, and the resulting water is removed under reduced pressure if necessary to obtain a polyester resin with a hydroxyl group. Next, a polyester resin having a hydroxyl group is reacted with a polyisocyanate at 40° C. to 140° C. to obtain a polyester prepolymer having an isocyanate group. Further, a urea-modified polyester resin is obtained by reacting a polyester prepolymer having an isocyanate group with an amine at 0° C. to 140° C.

The number-average molecular weight (Mn) of the modified polyester resin is not particularly limited and can be selected appropriately according to different purposes; however, the number-average molecular weight of the modified polyester resin is preferably 1,000 to 10,000 and is more preferably 1,500 to 6,000, as measured by GPC (gel permeation chromatography) measurement.

The weight-average molecular weight (Mw) of the modified polyester resin is not particularly limited and can be selected appropriately according to different purposes, but preferably 20,000 or more and 1,000,000 or less, as determined by GPC (gel permeation chromatography) measurement. When the weight-average molecular weight (Mw) of the modified polyester resin is 20,000 or more, the defect of poor heat resistant preservability due to the toner flowing easily at low temperatures, and the defect of lowering of high temperature offset resistance due to low viscosity during melting can be prevented.

When reacting a polyester resin having a hydroxyl group with a polyisocyanate, or when reacting a polyester prepolymer having an isocyanate group with an amine, a solvent may be used if necessary.

Solvents are not particularly limited and can be selected appropriately according to different purposes; examples of the solvents include aromatic solvents, ketones, esters, amides, ethers, etc., which are inert to isocyanate groups.

Examples of the aromatic solvents include toluene, xylene, etc. Examples of the ketones include acetone, methyl ethyl ketone, methyl isobutyl ketone, etc. Examples of the esters include ethyl acetate and the like. Examples of the amides include dimethylformamide, dimethylacetamide, etc. Examples of the ethers include, tetrahydrofuran, etc.

The glass transition temperature (Tg) of the modified polyester resin is preferably −60° C. or higher and 0° C. or lower, and more preferably −40° C. or higher and −20° C. or lower. When the glass transition temperature (Tg) of the modified polyester resin is-60° C. or higher, the flow of toner at low temperatures cannot be prevented, and defects such as deterioration of heat resistant preservability and deterioration of film resistance can be prevented. When the glass transition temperature (Tg) of the modified polyester resin is 0° C. or lower, it is possible to prevent the defect from insufficient low temperature fixability due to insufficient deformation of the toner by heating and pressurizing during fixing.

The content of the modified polyester resin is not particularly limited and can be selected appropriately according to different purposes; however, the content of the modified polyester resin is preferably 1 to 15 parts by mass and is more preferably 5 to 10 parts by mass, with respect to 100 parts by mass of toner.

The molecular structures of amorphous polyester resins and modified polyester resins can be determined by NMR measurements in solutions and solids, as well as X-ray diffraction, GC/MS, LC/MS, IR measurements, etc. A simple method may include detecting, as amorphous polyester resins, those having no absorption at 965±10 $cm^{-1}$ and 990±10 $cm^{-1}$ based on the OCH (out-of-plane bending vibration) of olefin in the infrared absorption spectrum.

<<Colorant>>

The colorant is not particularly limited and can be selected appropriately according to different purposes; examples of the colorant include carbon black, nigrosine dye, iron black, naphthol yellow S, Hansa yellow (10G, 5G, G), cadmium yellow, yellow iron oxide, ochre, yellow lead, titanium yellow, polyazo yellow, oil yellow, Hansa yellow (GR, A, RN, R), pigment yellow L, benzidine yellow (G, GR), permanent yellow (NCG), vulcan fast yellow (5G, R), tartrazine lake, quinoline yellow lake, anthrazan yellow BGL, isoindolinon yellow, bengala, red lead, vermillion lead, cadmium red, cadmium mercury red, antimony red, permanent red 4R, para red, fiser red, parachlor orthonitroaniline red, lithol fast scarlet G, brilliant fast scarlet, brilliant carmine BS, permanent red (F2R, F4R, FRL, FRLL, F4RH), fast scarlet VD, Vulcan fast rubine B, brilliant scarlet G, lithol rubine GX, Permanent Red F5R, brilliant carmine 6B, pigment scarlet 3B, bordeaux 5B, toluidine maroon, permanent bordeaux F2K, heliobordeaux BL, Bordeaux 10B, bon maroon light, bon maroon medium, eosin lake, rhodamine lake B, rhodamine lake Y, alizarin lake, thio indigo red B, thio indigo maroon, oil red, quinacridone red, pyrazolone red, polyazo red, chrome vermillion, benzidine orange, perinone orange, oil orange, cobalt blue, cerulean blue, alkaline blue lake, peacock blue lake, victoria blue lake, metal-free phthalocyanine blue, phthalocyanine blue, fast sky blue, indanthren blue (RS, BC), indigo, ultramarine, deep blue, anthraquinone blue, fast violet B, methyl violet lake, cobalt purple, manganese purple, dioxane violet, anthraquinone violet, chromium green, zinc green, chromium oxide, pyridian, emerald green, pigment green B, naphthol green B, green gold, acid green lake, malachite green lake, phthalocyanine green, anthraquinone green, titanium oxide, zinc flower, ritobone, etc.

The content of the colorant is not particularly limited and can be selected appropriately according to different purposes; however, the content of the colorant is preferably 1 part by mass or more and 15 parts by mass or less, and is more preferably 3 parts by mass or more and 10 parts by mass or less, with respect to 100 parts by mass of toner.

The colorant may also be used as a masterbatch complexed with resin. Examples of the resin include styrene or polymers of its substitutes such as polystyrene, polyp-chlorostyrene, polyvinyltoluene; styrene-based copolymers such as styrene-p-chlorostyrene copolymers, styrene-propylene copolymers, styrene-vinyl toluene copolymers, styrene-vinyl naphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-α-methyl chlormethacrylate copolymers, styrene-acrylonitrile copolymers, styrene-vinyl methyl ketone copolymers, styrene-butadiene copolymers, styrene-isoprene copolymers, styrene-acrylonitrile indene copolymers, styrene-maleic acid copolymers, styrene-maleate copolymers; styrene-based copolymers such as polymethyl methacrylate, polybutyl methacrylate, polyvinyl chloride, polyvinyl acetate, polyethylene, polypropylene, polyester, epoxy resin, epoxy polyol resin, polyurethane, polyamide, polyvinyl butyral, polyacrylic acid resin, rosin, modified rosin, terpene resin, aliphatic or alicyclic hydrocarbon resin, aromatic petroleum resin, chlorinated paraffin, paraffin wax, etc. These examples may be used alone or in combination of two or more.

A masterbatch can be obtained by mixing and kneading a masterbatch resin and a colorant under high shear force. In this case, an organic solvent can be used to enhance the interaction between the colorant and the resin. The so-called flushing method, in which an aqueous paste containing water of a colorant is mixed and kneaded with a resin and an organic solvent to transfer the colorant to the resin side and remove the moisture and organic solvent components, is also preferably used because the wet cake of the colorant can be used as it is without the need to dry. A high shear disperser such as a three-roll mill is preferably used for mixing and kneading.

<<Waxes>>

Waxes (release agent) are not particularly limited and can be appropriately selected from known waxes, for example, natural wax, synthetic wax, etc. These may be used alone or in combination of two or more.

Natural waxes include, for example, plant-based waxes such as carnauba wax, cotton wax, wood wax, rice bran wax, etc.; animal-based waxes such as beeswax, lanolin, etc.; mineral waxes such as ozocerite, sercin, etc.; petroleum-based waxes such as paraffin, microcrystalline, petrolatum, etc.

Synthetic waxes include, for example, synthetic hydrocarbon waxes such as paraffin wax, Fisher-Tropsch wax, polyethylene wax, polypropylene wax, etc.; fatty acid amide-based compounds such as esters, ketones, ethers, 12-hydroxystearic amides, stearic amides, phthalic anhydride imides, chlorinated hydrocarbons, etc.; homopolymers or copolymers of polyacrylates (e.g., copolymers of n-stearyl acrylate-ethyl methacrylate, etc.) such as poly-n-stearyl methacrylate, poly-n-lauryl methacrylate, etc., which are low-molecular-weight crystalline polymer resins; and crystalline polymers with long alkyl groups in the side chains. Among these, hydrocarbon wax is preferable.

The melting point of the wax is not particularly limited and can be selected appropriately according to different purposes; however, the melting point of the wax preferably is 60° C. or higher and 80° C. or lower. If the melting point of the wax is 60° C. or higher, inferior heat resistant preservability due to a mold release agent becoming easy to melt at low temperatures can be removed. If the melting point of the wax is 80° C. or lower, image defects due to a fixing offset, which results from insufficiently melting of the wax despite the melted resin being within the fixing temperature range, can be prevented.

The content of the wax is not particularly limited and can be selected appropriately according to different purposes; however, the content of the wax is preferably 2 parts by mass or more and 10 parts by mass or less, and is more preferably 3 parts by mass or more and 8 parts by mass or less, with respect to 100 parts by mass of the toner matrix particles.

When the content of the wax is 2 parts by mass or more, it is possible to prevent defects such as deterioration in high temperature offset resistance and low temperature fixability at the time of fixing, and when the content of the wax is 10 parts by mass or less, it is possible to prevent defects such as deterioration in heat resistant preservability and image blurring.

Other components in the toner matrix particles that are used for ordinary toner matrix particles are not particularly limited and can be selected appropriately according to different purposes. The content of other components is not particularly limited as long as it does not harm the nature of the toner and can be selected appropriately according to different purposes.

<Other Components>

Other components in toner, which are used for ordinary toners, are not particularly limited and can be selected appropriately according to different purposes; examples of the other components in toner include charge control agents, external additives, flow improvers, cleanability enhancers, magnetic materials, etc.

-Charge Control Agents-

Charge control agents are not particularly limited and can be selected appropriately according to different purposes; examples of the charge control agents include nigrosine-based dyes, triphenylmethane-based dyes, chromium-containing metal complex dyes, molybdate chelate pigments, rhodamine-based dyes, alkoxy amines, quaternary ammonium salts (including fluorine-modified quaternary ammonium salts), alkylamides, single substances or compounds of phosphorus, single substances or compounds of tungsten, fluorine-based activators, metal salicylate salts, metal salts of salicylic acid derivatives, etc.

Commercially available products of charge control agents include, for example, Bontron 03 for nigrosine dyes, Bontron P-51 for quaternary ammonium salts, Bontron S-34 for metal-containing azo dyes, E-82 for oxynaphthoic acid metal complexes, E-84 for salicylic acid metal complexes, E-89 for phenolic condensates (manufactured by Orient Chemical Industries Co., Ltd.), TP-302 for quaternary ammonium molybdenum complexes, TP-415 (manufactured by Hodogaya Chemical Co., Ltd.), LRA-901, LR-147 for boron complexes (manufactured by Japan Carlit Co., Ltd.), etc.

The content of the charge control agent is determined according to a type of binder resin, the presence or absence of additives to be used if necessary, and the toner production method including the dispersion method, and is not uniquely limited; however, the content of the charge control agent is preferably 0.1 to 10 parts by mass, and is more preferably 0.2 to 5 parts by mass, with respect to 100 parts by mass of the binder resin. When the content of the charge control agent is 10 parts by mass or less, it is possible to prevent lowering of the developer flowability and lowering of the image density due to increased electrostatic attraction with the developing roller, which is caused by reduction in the effectiveness of the main charge control agent resulting from excessive chargeability of the toner.

The charge control agent may be dissolved and dispersed after being melt-kneaded with the masterbatch and resin, may be added when directly dissolved or dispersed in an organic solvent, or may be immobilized on the toner surfaces after preparation of the toner particles.

-External Additives-

External additives are not particularly limited and can be selected appropriately according to different purposes; examples of the external additives include silica fine particles, hydrophobic silica, fatty acid metal salts (e.g., zinc stearate, aluminum stearate, etc.), metal oxides (e.g., titania, alumina, tin oxide, antimony oxide, etc.), fluoropolymers, etc. Among these, inorganic fine particles are preferable, and hydrophobized inorganic fine particles are more preferable.

The hydrophobized inorganic fine particles are not particularly limited and can be selected appropriately according to different purposes; however, examples of the hydrophobized inorganic fine particles include hydrophobized titanium oxide fine particles, hydrophobized silica fine particles, etc. These examples may be used alone or in combination of two or more.

Commercially available products of silica fine particles include, for example, R972, R974, RX200, RY200, R202, R805, and R812 (manufactured by NIPPON AEROSIL CO., LTD.).

Commercially available products of titania include, for example, P-25 (manufactured by NIPPON AEROSIL CO., LTD.), STT-30, STT-65C-S (manufactured by TITANIUM INDUSTRIES, LTD.), TAF-140 (manufactured by FUJI TITANIUM INDUSTRY CO., LTD.), MT-150W, MT-500B, MT-600B, MT-150A (manufactured by TAYCA CORPORATION).

Commercially available products of hydrophobized titanium oxide fine particles include, for example, T-805 (manufactured by NIPPON AEROSIL CO., LTD.), STT-30A, STT-65 S-S (Both manufactured by Titanium Industries, Ltd.), TAF-500T, TAF-1500T (manufactured by FUJI TITANIUM INDUSTRY CO., LTD.), MT-100S, MT-100T (manufactured by TAYCA CORPORATION), IT-S (manufactured by ISHIHARA SANGYO KAISHA, LTD.), etc.

Hydrophobization treatment can be performed by using, for example, a silane coupling agent such as methyltrimethoxysilane, methyltriethoxysilane, octyltrimethoxysilane, etc., for hydrophilic fine particles. Silicone oil treated oxide fine particles and silicone oil treated inorganic fine particles, in which oxide fine particles or inorganic fine particles are treated with silicone oil, are also suitable. In the treatment with silicone oil, heat may be optionally applied.

The silicone oil is not particularly limited and can be selected appropriately according to different purposes; examples of the silicone oil include dimethylsilicone oil, methylphenylsilicone oil, chlorphenylsilicone oil, methylhydrogensilicone oil, alkyl-modified silicone oil, fluorine-modified silicone oil, polyether-modified silicone oil, alcohol-modified silicone oil, amino-modified silicone oil, epoxy-modified silicone oil, epoxy-polyether-modified silicone oil, phenol-modified silicone oil, carboxyl-modified silicone oil, mercapto-modified silicone oil, methacrylic-modified silicone oil, a-methylstyrene-modified silicone oil, etc.

The average particle size of the primary particles of the external additive is not particularly limited and can be selected appropriately according to different purposes; however, the average particle size of the primary particles of the external additive is preferably 100 nm or less, is more preferably 1 nm to 100 nm, is still more preferably 3 nm to 70 nm, and is particularly preferably 5 nm to 70 nm. When the average particle size of the primary particles of the external additive is within the above range, it is possible to prevent defects such as inorganic fine particles being buried in the toner, making it difficult for them to function effectively, and damaging of the photoreceptor surface unevenly.

The external additive preferably contains at least one or more types of inorganic fine particles having the hydrophobized primary particles with an average particle size of 20 nm or less and at least one type of inorganic fine particles with an average particle size of 30 nm or more.

A BET specific surface area of the external additive is preferably from 20 $m^2/g$ to 500 $m^2/g$. The BET specific surface area of the external additive can be measured in the same manner as the measurement of a BET specific surface area of the toner matrix particles (described below).

The content of the external additive is not particularly limited and can be selected appropriately according to different purposes; however, the content of the external additive is preferably 0.1 parts by mass or more and 5 parts by mass or less, and is more preferable 0.3 parts by mass or more and 3 parts by mass or less, with respect to 100 parts by mass of the toner.

-Flow Improvers-

Flow improvers are not particularly limited as long as the flow improver can be surface-treated to increase the hydrophobicity and prevent deterioration of flow and charging characteristics even under high humidity, and can be selected appropriately according to different purposes; examples of the flow improver include silane coupling agents, silylating agents, silane coupling agents with alkyl fluoride groups, organic titanate coupling agents, aluminum coupling agents, silicone oils, modified silicone oils, etc.

Silica and titanium dioxides are particularly preferable for use as hydrophobic silica and hydrophobic titanium dioxides after surface treatment with flow improvers.

-Cleaning Improvers-

Cleaning improvers are not particularly limited as long as the cleaning improvers are added to toner to remove the developer remaining in the photoreceptors or in the primary transfer medium after transfer, and can be selected appropriately according to different purposes; examples of the cleaning improvers include fatty acid metal salts such as zinc stearate, calcium stearate, stearic acid, polymer fine particles produced by soap-free emulsion polymerization of polymethyl methacrylate fine particles, polystyrene fine particles, etc.

The polymer fine particles with a relatively narrow particle size distribution are preferable, and the polymer fine particles with a volume-average particle size of 0.01 μm to 1 μm are also preferable.

-Magnetic Materials-

Magnetic materials are not particularly limited and can be selected appropriately according to different purposes; examples of the magnetic materials include iron powder, magnetite, ferrite, etc. Among these, white magnetic materials are preferable in terms of color tone.

The glass transition temperature (Tg 1st) of the toner according to the present embodiment in the first heating of differential scanning calorimetry (DSC) is preferably 40° C. to 65° C.

In the tetrahydrofuran (THF)-insoluble component of toner, the glass transition temperature (Tg 1st) in the first heating of DSC is preferably-45° C. to 5° C. In the THF-soluble component of toner, the glass transition temperature (Tg 2nd) in the second heating of DSC is preferably 20° C. to 65° C.

The glass transition temperature (Tg 1st) in the first heating and the glass transition temperature (Tg 2nd) in the second heating of differential scanning calorimetry (DSC) of the toner preferably satisfy Tg 1st-Tg 2nd≥10° C., in that the toner with improved low temperature fixability and heat resistant preservability can be obtained.

The glass transition temperature of the above toners can be measured using, for example, a differential scanning calorimeter (DSC-60, manufactured by Shimadzu Corporation). For example, the DSC curve is measured using the differential scanning calorimeter described above. From the obtained DSC curve, the analysis program can be used to select the DSC curve in the first heating, and the glass transition temperature (Tg 1st) in the first heating can be obtained using the endothermic shoulder temperature in the analysis program. The DSC curve in the second heating can be selected and the endothermic shoulder temperature can be used to determine the glass transition temperature (Tg 2nd) in the second heating.

<Voids>

As described above, In the toner according to the present embodiment, there are voids inside the toner matrix particles. Such voids can be determined, for example, by SEM observation of a cross-section of ruthenium-stained toner matrix particles. More specifically, such voids can be determined by comparing a secondary electron image and a reflected electron image taken by cross-sectional SEM. That is, in the secondary electron image, both the wax contained in the toner matrix particles and voids are observed in black, but in the reflected electron image, only the wax is observed in black and the voids are not (observed in gray). Thus, areas that are observed black in the secondary electron image but not observed black (observed in gray) in the reflected electron image are identified as voids.

The size of the voids determined as described above can be measured as follows. Using image processing software (ImageJ), the outer circumference of a void is measured, and the diameter of a perfect circle with the same circumference as the measured circumference is determined as a void diameter Φ.

Examples of imaging conditions in a scanning electron microscope (SEM) is illustrated below.

[Imaging Conditions]

Scanning electron microscope: SU-8230 (manufactured by Hitachi High Technologies)

Imaging magnification: 60,000×

Image: SE (L): secondary electron, BSE (reflected electron)

Acceleration voltage: 3.0 kV

Acceleration current: 1.0 μA

Probe current: Normal

Focal mode: UHR

WD: 8.0 mm.

In the presence of voids, the average number of voids with a void diameter Φ of 200 nm or more and 500 nm or less per toner (or per toner matrix particle) is preferably 5 or more and 10 or less. When the average number of voids with a void diameter Φ of 200 nm or more and 500 nm or less per toner is 5 or more, the flowability can further be improved, thus improving the toner replenishment properties (toner transferability) and preventing the image density unevenness due to the deterioration of charge buildup performance. In addition, when the average number of voids with a void diameter Φ of 200 nm or more and 500 nm or less per toner is 10 or less, the transfer dust of toner which can be generated during transfer due to excessively bulkiness can be prevented (the transferability is improved).

Furthermore, in the present embodiment, it is more preferable that the average number of voids with a void diameter Φ of 200 nm or more and 300 nm or less is 5 or more and 10 or less per toner (one toner matrix particle). When the average number of voids with a void diameter Φ of 200 nm or more and 300 nm or less per toner is 5 or more, the flowability is further improved and the toner replenishment properties is further improved, as well as the charge buildup performance is improved and uneven image density is further prevented. In addition, when the average number of voids with a void diameter Φ of 200 nm or more and 300 nm or less per toner is 10 or less, the excessively high bulkiness can be prevented and the transfer dust of toner which may be generated during transfer can be further prevented (the transferability is improved).

In addition, the average number of voids with a void diameter Φ exceeding 500 nm per toner is preferably less than 1 per toner, more preferably 0.3 or less, and even more preferably 0. When the number of voids with a void diameter Φ exceeding 500 nm is within the above ranges, excessive increase in flowability can be prevented and toner replenishment properties can be improved.

In order to obtain the average number of toner particles per toner with the above predetermined void diameter Φ, it is preferable to randomly select 10 or more toner particles for measurement and obtain the average value.

In the present embodiment, the BET specific surface area of the toner matrix particles is preferably 1.2 to 2.1 $m^2/g$ and more preferably 1.4 to 2.0 $m^2/g$. By having the BET specific surface area within the above ranges, the unfavorable aggregation of toner during transfer can be prevented and the transferability can be improved. In addition, even when the BET specific surface area of the toner matrix particles is relatively low, for example, 1.8 $m^2/g$ or less, according to the present embodiment, which has a predetermined number of voids with a void diameter Φ of 200 nm or more and 500 nm or less as described above, an appropriate loosened apparent density can be obtained, and consequently, an appropriate flowability can be obtained. Thus, both the transferability and the toner replenishment properties can be obtained.

A BET specific surface area of toner matrix particles can be determined by the nitrogen adsorption method, and measured, for example, by using a fully automated specific surface area measuring device Macsorb (registered trademark) HM model-1200 series (MOUNTECH) according to the BET flow method, such as HM model-1201 and HM model-1208.

The average circularity (also called the circularity coefficient) of the toner matrix particles is preferably 0.97 to 0.99 and more preferably 0.974 to 0.984. The average circularity of 0.97 or more increases the effective coverage of the external additive and improves the transferability. In addition, even in a case of toner containing toner matrix particles with a relatively large average circularity, especially with an average circularity of 0.975 or more, toner according to the embodiment having a predetermined number of voids with a void diameter Φ of 200 nm or more and 500 nm or less as described above can have an appropriate loose apparent density and thus an appropriate flowability. Thus, both transferability and toner replenishment properties can be achieved.

The average circularity can be measured using, for example, FPIA-3000 (manufactured by Sysmex Corporation). The definition of average circularity is as follows:

(AVERAGE CIRCULARITY)=(PERIMETER OF A CIRCLE OF THE SAME AREA AS THE PROJECTED AREA OF A PARTICLE)/(PERIMETER OF A PROJECTED IMAGE OF A PARTICLE)

The average circularity can be determined as follows, for example. With respect to 30 mL of ion-exchanged water, 2 mL of a desired surfactant and 0.05 g of the sample to be measured are charged and dispersed using a dispersing ultrasonic oscillator. During dispersion, dispersion is carried out for 2 to 3 minutes to obtain the prescribed dispersion. Then, using the flow-type particle image measuring device described above, the dispersion is readjusted so that the concentration of the dispersion is approximately 5000 to 10,000 particles/μL, and the measurement is carried out. The measurement results are analyzed in the range of data from 2 μm to 200 μm in toner circular equivalent diameter to calculate the average circularity of the toner.

(Developers)

In the present embodiment, a developer contains at least a toner according to the present embodiment and optionally contains other components selected appropriately, such as a carrier. The developer can be either a single-component developer or a two-component developer, but a two-component developer is preferable for use in high-speed printers and other applications that respond to recent improvements in information processing speed, as it improves service life.

<Carriers>

Carriers are not particularly limited and can be selected appropriately according to different purposes; however, the carriers preferably have core materials and resin layers covering the core materials.

<<Core Materials>>

Core materials are not particularly limited and can be selected appropriately according to different purposes; examples of the core materials include manganese-strontium-based materials of 50 emu/g to 90 emu/g, manganese-magnesium-based materials of 50 emu/g to 90 emu/g, etc. In order to secure image density, it is preferable to use highly magnetized materials such as iron powder of 100 emu/g or more and magnetite of 75 emu/g to 120 emu/g. In addition, it is preferable to use a low-magnetization material such as copper-zinc-based materials in the range of 30 emu/g to 80 emu/g, because the impact of the developer in a raised state on the photoreceptor can be mitigated, which is advantageous for high image quality. These materials may be used alone or in combination of two or more.

The volume-average particle size of the core material is not particularly limited and can be selected appropriately according to different purposes; however, the volume-average particle size of the core material is preferably 10 μm to 150 μm and is more preferably 40 μm to 100 μm. When the volume-average particle size of the core material is 10 μm or more, defects such as increased fine particles in the carrier, resulting in lower magnetization per particle and carrier scattering can be eliminated. When the volume-average particle size of the core material is 150 μm or less, the specific surface area is reduced to cause toner scattering, which can eliminate defects such as poor reproduction of solid areas, especially in full color with many solid areas.

The toner according to the present embodiment can be mixed with the above carrier and used in a two-component developer. The carrier content in a two-component developer is not particularly limited and can be selected appropriately according to different purposes; however, the carrier content in a two-component developer is preferably 90 parts by mass or more and 98 parts or less by mass and is more preferably 93 parts by mass or more and 97 parts by mass or less, with respect to 100 parts by mass of the two-component developer.

The developer according to the present embodiment can be suitably used for image formation by various known electrophotographic methods such as a single component magnetic development method, a single component non-magnetic development method, and two-component development method.

(Toner Production Method)

The toner production method according to the present embodiment is not particularly limited. As a method of producing toner matrix particles in the toner according to the present embodiment, a pulverization method may be given. Alternatively, a dissolution suspension method, an emulsion aggregation method or the like may be given, in which an oil phase is dispersed in a water phase composed of a water-based medium to form fine particles.

The toner matrix particles in the present embodiment are, for example, preferably obtained by dissolving or dispersing toner materials containing at least polyester and/or a binder resin precursor (modified polyester), a colorant and a release agent in an organic solvent, dispersing the resulting oil phase in a water-based medium (water phase), and removing the organic solvent from the resulting oil/water phase (O/W) type dispersion to obtain fine particles. To obtain such an O/W type dispersion (emulsified dispersion), it is preferable that active hydrogen group-containing compounds and polymers that can react with the active hydrogen group-containing compounds are dissolved in the oil phase, and then the oil phase is dispersed in a water phase composed of a water-based medium in which fine particle dispersants are present. Furthermore, it is preferable to crosslink and/or elongate the binder resin component in the emulsion dispersion.

That is, the toner matrix particles are preferably obtained by dispersing a solvent or a dispersion containing an organic solvent, an active hydrogen group-containing compound capable of producing a modified polyester containing at least an ester bond and a bonding unit other than the ester bond in the molecular structure, and a polymer capable of reacting with the active hydrogen group-containing compound in the water phase to form an emulsion dispersion, crosslinking and/or elongating the active hydrogen group-containing compound and the polymer in the emulsion dispersion, and removing the organic solvent from the emulsion dispersion to obtain fine particles.

-Pulverization Method-

The pulverization method is a method of obtaining toner matrix particles by, for example, charging a mixture of toner materials into a melt kneader, melting and kneading the mixture, pulverizing and classifying the mixture. In the case of the pulverization method, for the purpose of adjusting the average circularity of toner, mechanical impact force may be applied to the obtained toner matrix particles to control the shapes. In this case, the mechanical impact force can be applied using devices such as hybritizers, mechanofusions, etc.

-Dissolution Suspension Method-

The dissolution suspension method is a method of forming toner particles by dissolving or dispersing toner materials consisting mainly of a binder resin or binder resin material and a colorant in an organic solvent to form a dissolved or dispersed material (oil phase), emulsifying or dispersing the dissolved or dispersed material in a water-based medium (water phase) to prepare an emulsion or dispersion solution, and granulating the prepared emulsion or dispersion.

In the method of producing toner matrix particles, it is preferable to emulsify or disperse a dissolved or dispersed material (oil phase) of toner materials containing at least an active hydrogen group-containing compound and a polymer capable of reacting with the active hydrogen group-containing compound in a water-based medium (water phase), and allow the active hydrogen group-containing compound to react with the polymer capable of reacting with the active hydrogen group-containing compound in the water-based medium for granulation. It is preferable that an adhesive base material described later is produced by allowing an active hydrogen group-containing compound to react with a polymer capable of reacting with the active hydrogen group-containing compound in a water-based medium.

Specifically, the toner matrix particles are preferably prepared by dispersing a solution or a dispersion containing an organic solvent, an active hydrogen group-containing compound capable of producing a modified polyester containing at least an ester bond and a bonding unit other than the ester bond in the molecular structure, and a polymer capable of reacting with the active hydrogen group-containing compound in a water phase to form an emulsified dispersion, crosslinking and/or elongating the active hydrogen group-containing compound and the polymer in the emulsified dispersion, and granulating the emulsified dispersion by removing the organic solvent from the emulsified dispersion. A polymer obtained by crosslinking and/or elongating a hydrogen group-containing compound and a polymer capable of reacting with the active hydrogen group-containing compound is a modified polyester and functions as an adhesive base material.

The solution or dispersion of toner materials is prepared by dissolving or dispersing the toner materials in an organic solvent. The toner materials are not particularly limited as long as the toner materials are capable of forming toner and can be selected appropriately according to different purposes. For example, the toner materials may contain either an active hydrogen group-containing compound or a polymer (prepolymer) that can react with the active hydrogen group-containing compound, and may optionally contain an unmodified polyester or any of the above-described other components such as a release agent, colorant, etc.

The solution or dispersion of the toner materials are preferably prepared by dissolving or dispersing the toner materials in an organic solvent.

In the dissolving or dispersing process, it is preferable to use a disperser in order to achieve a finely dispersed state of inorganic filler. Dispersers are not particularly limited; however, examples of the dispersers include high-speed rotating shear dispersers, media-type dispersers, etc. The media-type dispersers are preferable as a method of producing a toner according to the present embodiment, especially from the view point of excellent material refinement.

The organic solvent is preferably removed during or after granulation of toner. The organic solvent for dissolving or dispersing the toner materials are not particularly limited as long as the organic solvent is a solvent capable of dissolving or dispersing toner materials and can be appropriately selected according to different purposes. In terms of facilitating removal during or after granulation of toner, it is preferable that the organic solvent has the boiling point less than 150° C. Examples of such an organic solvent include toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, methyl isobutyl ketone, etc. Ester solvents are preferable, especially ethyl acetate. These examples may be used alone or in combination of two or more.

The amount of organic solvent to be used is not particularly limited and can be selected appropriately according to different purposes; however, the amount of organic solvent to be used is preferably 40 to 300 parts by mass with respect to 100 parts by mass of the toner materials, is more preferably 60 to 140 parts by mass, and is even more preferably 80 to 120 parts by mass. Solution or dispersion of the toner materials can be prepared by dissolving or dispersing toner materials such as an active hydrogen group-containing compound, a polymer reactive with the active hydrogen group-containing compound, an unmodified polyester, a release agent, a colorant, a charge control agent, etc., in an organic solvent.

In addition, components of the toner materials other than polymers (prepolymers) that can react with active hydrogen group-containing compounds may be added and mixed in the water-based medium in the preparation of the water-based medium described later, or may be added to the water-based medium together with the solution or dispersion when the solution or dispersion of the toner materials is added to the water-based medium.

The water-based medium is not particularly limited, and can be selected appropriately from known aqueous media; examples of the water-based medium include, for example, water, a solvent miscible with water, a mixture of these, etc. Among these, water is particularly preferable. The solvent that can be miscible with water is not particularly limited as long as such a solvent can be miscible with water; examples of the solvent include, for example, alcohols, dimethylformamide, tetrahydrofuran, cellosolves, lower ketones, etc., can be used. Examples of alcohols include methanol, isopropanol, ethylene glycol, etc. Examples of lower ketones include acetone, methyl ethyl ketone, etc. These may be used alone or in combination of two or more.

The solution or dispersion of the toner materials is preferably emulsified or dispersed in a water-based medium while stirring the solution or dispersion of toner materials in the water-based medium. The method of dispersion is not particularly limited and can be selected appropriately according to different purposes, for example, by using a known disperser. Dispersers include low-speed shear dispersers and high-speed shear dispersers. In this toner production method, an adhesive base material (binder resin) is formed when an active hydrogen group-containing compound and a polymer capable of reacting with the active hydrogen group-containing compound are subjected to an elongation reaction or cross-linking reaction during emulsification or dispersion.

Organic solvents are removed from the emulsified slurry obtained by emulsification or dispersion. Examples of the removal of the organic solvent include (1) a method in which the temperature of the entire reaction system is gradually raised to completely evaporate and remove the organic solvent in the oil droplets, and (2) a method in which the emulsified dispersion is sprayed into a dry atmosphere to completely remove the water-insoluble organic solvent in the oil droplets to form toner particulates and to evaporate and remove the water-based dispersant.

When the organic solvent is removed, toner matrix particles are formed. The formed toner matrix particles are cleaned. After cleaning, the water-based slurry in which the toner is dispersed is heat-treated, dehydrated, and dried. In the heat treatment (drying step) of the water-based slurry, it is preferable to dry the toner particles obtained in the cleaning step at a temperature above the glass transition temperature minus 20° C. (exceeding a temperature that is 20° C. below glass transition temperature) and below the glass transition temperature. Thus, appropriate voids are formed in the toner matrix particles in the resulting toner, and a toner excellent in both transferability and toner replenishment properties can be obtained.

Then, classification, etc. is carried out as desired. The classification is carried out, for example, by removing the fine particle part by cyclone, decanter or centrifugation in a liquid. The classification operation may be performed after the toner particles are dried and obtained as powder.

-Emulsion Aggregation Method-

The emulsion polymerization aggregation method (also called the emulsion aggregation method) is a method in which an oil phase or a monomer phase containing toner materials is dispersed and/or emulsified in a water-based medium (water phase) and granulated to obtain toner matrix particles. In this method, a resin particle dispersion prepared by emulsion polymerization and a dispersion in which a colorant, a release agent, and the like are dispersed can be hetero-aggregated and then fuse-integrated.

The emulsion polymerization aggregation fusion method includes a preparation step of mixing a resin particle dispersion prepared by the emulsion polymerization method, a colorant dispersion, and optionally a release agent dispersion to aggregate the resin particles and the colorant to form aggregated particles (hereinafter sometimes referred to as an "aggregation step"), and a step of heat-fusing the aggregated particles to form toner particles (hereinafter sometimes referred to as a "fusion step").

In the aggregation step, a resin particle dispersion, a colorant dispersion and optionally a release agent dispersion are mixed with each other, and aggregating the resin particles, etc., to form aggregated particles. The aggregated particles are formed by heteroaggregation, etc., and in this step, ionic surfactants with different polarities from those of the aggregated particles, or compounds with univalent or higher charge such as metal salts can be added for the purpose of stabilizing the aggregated particles and controlling the particle size/size distribution. In the fusion step, the resin is heated to a temperature above the glass transition temperature of the resin in the aggregated particles to melt the resin.

In the preceding stage of the fusion step, an adhesion step may be provided in which the aggregated particle dispersion is mixed with other fine particle dispersions to uniformly adhere fine particles to surfaces of the aggregated particles to form adhered particles.

The fusion particles fused in the fusion step are present in the water-based medium as a colored fusion particle dispersion, the fusion particles are removed from the water-based medium in the cleaning step, at the same time as impurities mixed in the above steps are removed, and are then dried to obtain toner matrix particles as powder. In the cleaning step, acidic or possibly basic water that is several times the amount of the fusion particles is added, stirred, and then filtered to obtain solids. Pure water that is several times the solid content is added, stirred, and filtered. This process is repeated several times until the pH of the filtered filtrate is approximately 7.

The water-based slurry in which the toner is dispersed is then heated and dried to obtain colored toner particles. At this time, dry air is circulated or heated under vacuum conditions as necessary. In the heat treatment (drying step) of the water-based slurry, it is preferable to dry the toner particles obtained in the cleaning step at a temperature above the glass transition temperature minus 20° C. (exceeding a temperature 20° C. below the glass transition temperature) and below the glass transition temperature. Thus, appropriate voids are formed in the toner matrix particles in the resulting toner, and the toner excellent in both transferability and toner replenishment properties can be obtained.

Toner is then obtained by adding an external additive to the surfaces of dried toner matrix particles.

To stabilize the dispersibility of the resin particle dispersion, colorant dispersion, and release agent dispersion, an alicyclic compound of an organic acid metal salt, which is an emulsifier, can be used as it is. However, if the dispersions are not always stable under basic conditions due to the pH stability of the colorant dispersion and release agent dispersion, or due to the stability of the resin particle dispersions over time, a small amount of surfactant can be used.

Surfactants include, for example, anionic surfactants such as sulfate, sulfonate, phosphate, and soap-based surfactants; cationic surfactants such as amine salt and quaternary ammonium salt types; and nonionic surfactants such as polyethylene glycol-based, alkyl phenol ethylene oxide adducts, polyhydric alcohol-based surfactants, etc.

Among the above surfactants, ionic surfactants are preferable, and anionic and cationic surfactants are more preferable. In toner according to the present embodiment, generally anionic surfactants have a strong dispersive force and excellent dispersibility of resin particles and colorants, so cationic surfactants are advantageous as surfactants for dispersing release agents. Nonionic surfactants are preferably used in combination with anionic or cationic surfactants. These surfactants may be used alone or in combination of two or more.

Specific examples of anionic surfactants include fatty acid soaps such as potassium laurate, sodium oleate, and sodium castor oil; sulfate esters such as octyl sulfate, lauryl sulfate, lauryl ether sulfate, nonylphenyl ether sulfate; sulfonates such as sodium alkylnaphthalenesulfonates such as lauryl sulfonate, dodecylbenzenesulfonate, triisoppyrnaphthalenesulfonate, dibutylnaphthalenesulfonate, naphthalenesulfonate formalin condensation products, monooctyl sulfosuccinate, dioctyl sulfosuccinate, amidosulfonate laurate, oleic acid amidosulfonate; phosphates such as lauryl phosphate, isopropyl phosphate, nonylphenyl ether phosphate; dialkyl sulfosuccinates such as sodium dioctyl sulfosuccinate, sulfosuccinates such as disodium lauryl sulfosuccinate; etc.

Specific examples of cationic surfactants include amine salts such as laurylamine hydrochloride, stearylamine hydrochloride, oleylamine acetate, stearylamine acetate, and stearylaminopropylamine acetate; quaternary ammonium salts such as lauryl trimethylammonium chloride, dilauryl dimethylammonium chloride, distearyl ammonium chloride, distearyl dimethylammonium chloride, lauryl dihydroxyethylmethylammonium chloride, oleyrbis polyoxyethylene methylammonium chloride, lauroyl aminopropyl dimethylethylammonium ethosulfate, lauroyl aminopropyl dimethylethylammonium perchlorate, alkylbenzene dimethylammonium chloride, alkyltrimethylammonium chloride; etc.

Specific examples of nonionic surfactants include alkyl ethers such as polyoxyethylene octyl ether, polyoxyethylene lauryl ether, polyoxyethylene stearyl ether, and polyoxyethylene oleyl ether; alkyl phenyl ethers such as polyoxyethylene octyl phenyl ether and polyoxyethylene nonyl phenyl ether; alkyl esters such as polyoxyethylene laurate, polyoxyethylene stearate, and polyoxyethylene olate; alkylamines such as polyoxyethylene lauryl aminoether, polyoxyethylene stearyl aminoether, polyoxyethylene oleyl aminoether, polyoxyethylene soybean aminoether, and polyoxyethylene beef tallow aminoether; alkylamides such as polyoxyethylene laurate amide, polyoxyethylene stearate amide, and polyoxyethylene oleate amide; vegetable oil ethers such as polyoxyethylene castor oil ether and polyoxyethylene rapeseed oil ether; alkanolamides such as diethanolamide laurate, diethanolamide stearate, and diethanolamide oleate; sorbitan ester ethers such as polyoxyethylene sorbitan monolaurate, polyoxyethylene sorbitan monopalmate, polyoxyethylene sorbitan monostearate, and polyoxyethylene sorbitan monooleate; etc.

The content of the surfactant in each dispersion is sufficient so as not to inhibit the features of the present embodiment, and is generally small. Specifically, the content of the surfactant in each dispersion is preferably 0.01 to 1 mass % in the case of resin particle dispersion, and is more preferably 0.02 to 0.5 mass %, and still more preferably 0.1 to 0.2 mass %. With the content of the surfactant of 0.01 mass % or more, aggregation can be prevented, especially when the pH of the resin particle dispersion is not sufficiently basic.

The content of the surfactant in the case of the colorant dispersion and the release agent dispersion is preferably 0.01 to 10 mass %, more preferably 0.1 to 5 mass %, and still more preferably 0.5 to 0.2 mass %. Since the stability between respective particles is different during aggregation, the content of 0.01 mass % or more can prevent the release of specific particles. If the content is 10 mass % or less, widening of particle size distribution and difficulty in controlling particle size can be prevented.

In the present embodiment, for example, a water-based medium or the like can be used as a dispersion medium for the resin particle dispersion, the colorant dispersion, the release agent dispersion, and the dispersions of other components. Specific examples of water-based media include distilled water, water such as ion exchange water, alcohol, etc. These examples maybe used alone or in combination of two or more.

In the step of preparing the aggregated particle dispersion, the aggregated particles can be adjusted by adjusting the emulsifying force of the emulsifier with pH to generate aggregations. At the same time, a flocculant may be added to stably and rapidly aggregate particles to obtain aggregated particles with a narrower size distribution.

As a flocculant, a compound with a monovalent or higher charge is preferable. Specific examples of such a flocculant with a monovalent or higher charge include water-soluble surfactants such as the aforementioned ionic surfactants, nonionic surfactants, etc., acids such as hydrochloric acid, sulfuric acid, nitric acid, acetic acid, and oxalic acid, metal salts of inorganic acids such as magnesium chloride, sodium chloride, aluminum sulfate, calcium sulfate, ammonium sulfate, aluminum nitrate, silver nitrate, copper sulfate, and sodium carbonate, metal salts of aliphatic and aromatic acids such as sodium acetate, potassium formate, sodium oxalate, sodium phthalate, and potassium salicylate, metal salts of phenols such as sodium phenolate, metal salts of amino acids, aliphatic acids such as triethanolamine hydrochloride and aniline hydrochloride, and inorganic salts of aromatic amines. Considering the stability of the aggregated particles, the stability of the flocculant against heat and aging, and removal of the flocculant during cleaning, metal salts of inorganic acids are preferable in terms of performance and use.

The amount of the flocculant to be added above varies depending on the valence of the charge; however, the amounts of the above flocculant examples to be added are all small amounts, preferably 3 mass % or less for monovalent, 1 mass % or less for divalent, and 0.5 mass % or less for trivalent. It is preferable to add less amount of the flocculant, and compounds with higher valence are preferable because such compounds can be added in smaller amounts.

Next, an external additive is added to the surfaces of the toner matrix particles to obtain a toner.

(Toner Storage Unit)

A toner storage unit according to an embodiment refers to a unit having a function of storing a toner according to an embodiment. Examples of the toner storage unit include a toner storage container, a developing device, a process cartridge, etc.

The toner storage container refers to a container storing toner according to an embodiment. The developing device refers to a device having functions of storing and developing toner according to an embodiment. The process cartridge refers to a cartridge that includes an integrated unit with at least an image carrier and a developing unit, is configured to contain toner according to an embodiment, and is detachable from an image forming apparatus. The process cartridge may further include at least one selected from a charging unit, an exposure unit, and a cleaning unit.

Herein, the process cartridge according to an embodiment will be described with reference to the accompanying drawings. An embodiment of the process cartridge is illustrated in FIG. 1. As illustrated in FIG. 1, the process cartridge according to the present embodiment incorporates a latent image carrier 101, includes a charger 102, a developing device 104, a cleaning unit 107, and optionally other units. In FIG. 1, the symbol 103 denotes exposure light from an exposure device and the symbol 105 denotes recording paper.

As the latent image carrier 101, an electrostatic latent image carrier similar to that used in the image forming apparatus described later can be used. An optional charging member is used for the charger 102. In an image forming process by the process cartridge illustrated in FIG. 1, while rotating clockwise in FIG. 1, the latent image carrier 101 is charged by the charger 102 and exposed with exposure light 103 by the exposure unit (not illustrated) to form an electrostatic latent image corresponding to the exposed image on the surface of the latent image carrier 101.

The electrostatic latent image is toner-developed by a developing device 104, and the toner developed image is transferred to recording paper 105 by a transfer roller 108 to be printed out. Then, the surface of the latent image carrier after image transfer is cleaned by a cleaning unit 107, further destaticized by a destaticizing unit (not illustrated), and the above operations are repeated again.

(Image Forming Apparatus and Image Forming Method)

An image forming apparatus according to the present embodiment preferably has the aforementioned toner storage unit, at least an electrostatic latent image carrier, an electrostatic latent image forming unit, a developing unit, and optionally other units.

An image forming method according to the present embodiment at least includes an electrostatic latent image forming step and a developing step, and further includes other steps optionally.

<Electrostatic Latent Image Carrier>

The materials, structure, and size of the electrostatic latent image carrier are not particularly limited and can be appropriately selected from the known materials. Examples of the materials of the electrostatic latent image carrier include inorganic photoreceptors such as amorphous silicon and selenium, and organic photoreceptors such as polysilane and phthalopolymethine. Among these, amorphous silicon is preferable in terms of long life. The linear velocity of the electrostatic latent image carrier is preferably 300 mm/s or more.

<Electrostatic Latent Image Forming Unit and Electrostatic Latent Image Forming Step>

The electrostatic latent image forming unit is not particularly limited as long as the electrostatic latent image forming unit is capable of forming an electrostatic latent image on the electrostatic latent image carrier and can be selected appropriately according to different purposes; examples of the electrostatic latent image forming unit include a unit having at least a charging member for charging the surface of the electrostatic latent image carrier and an exposure member for exposing the surface of the electrostatic latent image carrier in an image-like manner, etc.

The electrostatic latent image forming step is not particularly limited as long as the electrostatic latent image forming step is a step of forming an electrostatic latent image on an electrostatic latent image carrier and can be selected appropriately according to different purposes; the electrostatic latent image forming step can be carried out by charging the surface of the electrostatic latent image carrier and then exposing it in an image-forming manner, which can be carried out using an electrostatic latent image forming unit.

-Charging Members and Charging-

Charging members are not particularly limited and can be selected appropriately according to different purposes; examples of the charging members include contact chargers known per se with conductive or semiconducting rollers, brushes, films, rubber blades, etc., and non-contact band electric appliances using corona discharge such as corotrons and scorotrons. Among these, it is preferable to use a contact-type charging member because an image forming apparatus with reduced ozone generated from the charging member can be obtained.

The shape of the charging member can be any shape other than the roller, such as a magnetic brush or a fur brush, and can be selected according to the specifications and shape of the image forming apparatus. Charging can be performed, for example, by applying a voltage to the surface of the electrostatic latent image carrier using a charging member.

<<Exposure Member and Exposure>>

The exposure member is not particularly limited as long as the exposure member is capable of exposing the surface of the electrostatic latent image carrier charged by the charging member in an image-forming manner and can be selected appropriately according to different purposes; examples of the exposure member include various exposure members such as a copying optical system, a rod lens array system, a laser optical system, a liquid crystal shutter optical system, etc.

The light source used for the exposure member is not particularly limited and can be selected appropriately according to different purposes; examples of the light source include fluorescent lamps, tungsten lamps, halogen lamps, mercury lamps, sodium lamps, light emitting diodes (LED), semiconductor lasers (LD), electroluminescence (EL) and other luminous materials in general.

In addition, various filters such as sharp cut filters, band-pass filters, near-infrared cut filters, dichroic filters, interference filters, and color temperature conversion filters can be used for the light source used in the exposure member to emit only the light in the desired wavelength range.

Exposure can be performed, for example, by using an exposure member to expose the surface of the electrostatic latent image carrier in an image-forming manner. Note that in the present embodiment, an optical back surface method, in which exposure is performed in an image-forming manner from the back side of the electrostatic latent image carrier, may be employed.

<Developing unit and Development Process>

The developing unit is not limited as long as the developing unit is provided with a toner used for developing an electrostatic latent image on an electrostatic latent image carrier to form a toner image that is a visible image, and can be selected appropriately according to different purposes.

The developing step is not particularly limited as long as the developing step is a step of forming a toner image, which is a visible image, by developing an electrostatic latent image formed on an electrostatic latent image carrier using toner; and can be selected appropriately according to different purposes and be performed by a developing unit.

As the developing unit, a developing device is preferably used. Such a developing device includes a stirrer that friction-stirs and charges the toner and a developer carrier that has an internally fixed magnetic field generating unit, and can rotate while carrying a developer containing the toner on its surface.

<Other Units and Other Steps>

Other units include, for example, a transfer unit, a fixing unit, a cleaning unit, a static elimination unit, a recycling unit, etc.

-Transfer Unit and Transfer Step-

The transfer unit is not particularly limited as long as the transfer unit transfers a visible image onto a recording medium and can be selected appropriately according to different purposes; however, a mode having a primary transfer unit for transferring the visible image onto an intermediate transfer body to form a composite transfer image and a secondary transfer unit for transferring the composite transfer image onto the recording medium is preferable.

The transfer step is not particularly limited as long as the transfer step is a step of transferring the visible image onto the recording medium and can be selected appropriately according to different purposes; however, a mode using an intermediate transfer body for primarily transferring a visible image onto the intermediate transfer body and then secondarily transferring the visible image onto the recording medium is preferable. The transfer step can be carried out, for example, by charging a photoreceptor with a transfer charger for transferring a visible image, which can be carried out by the above-described transfer unit.

Herein, when the image to be secondarily transferred on the recording medium is a color image composed of toners of multiple colors, the transfer unit sequentially superimposes the toner of each color on the intermediate transfer body to form superimposed tone images on the intermediate transfer body, and the intermediate transfer unit secondarily transfers the superimposed images on the intermediate transfer body simultaneously onto the recording medium.

The intermediate transfer body is not particularly limited and can be selected appropriately from among known transfer bodies according to different purposes; examples of the intermediate transfer body include a transfer belt, etc. The transfer unit (primary and secondary transfer units) preferably at least has a transfer device that separates and charges the visible image formed on the photoreceptor toward the recording medium. Examples of the transfer device include a corona transfer device by corona discharge, a transfer belt, a transfer roller, a pressure transfer roller, an adhesive transfer device, etc. The recording medium is typically plain paper but is not particularly limited as long as the unfixed image after development can be transferred and can be selected appropriately according to different purposes; examples of the recording medium include a PET base for OHP.

-Fixing Unit and Fixing Step-

The fixing unit is not particularly limited as long as the fixing unit is a unit for fixing the transferred image transferred onto the recording medium and can be selected appropriately according to different purposes; examples of the fixing unit preferably include a known heating and pressurizing member.

Examples of the heating and pressurizing member include a combination of a heating roller and a pressurizing roller, and a combination of a heating roller, a pressurizing roller, and an endless belt.

The fixing step is not particularly limited as long as the fixing step includes fixing the visible image transferred to the recording medium and can be selected appropriately according to different purposes; the fixing step may be carried out every time the visible image for each color toner is transferred to the recording medium, or the fixing step may be carried out simultaneously for respective color toners in a laminated manner. The fixing step can be carried out by a fixing unit.

Heating in the heating and pressurizing member is preferably from 80° C. to 200° C.

In the present embodiment, for example, a known optical fixing device may be used with or instead of the fixing unit according to different purposes.

The surface pressure in the fixing step is not particularly limited and can be selected appropriately according to different purposes, but is preferably 10 N/cm$^2$ to 80 N/cm$^2$.

<<Cleaning Unit and Cleaning Step>>

The cleaning unit is not particularly limited as long as the cleaning unit can remove the toner remaining on the photoreceptor, and can be selected appropriately according to different purposes; examples of the cleaning unit include a magnetic brush cleaner, an electrostatic brush cleaner, a magnetic roller cleaner, a blade cleaner, a brush cleaner, a web cleaner, etc.

The cleaning step is not particularly limited as long as the cleaning step can remove the toner remaining on the photoreceptor, and can be selected appropriately according to different purposes; and the cleaning step may be performed by a cleaning unit, for example.

-Static Eliminating Unit and Static Eliminating Process-

The static eliminating unit is not particularly limited as long as the static eliminating unit is a unit for applying a static eliminating bias to the photoreceptor, and can be selected appropriately according to different purposes; examples of the static eliminating unit include a static eliminating unit lamp, etc. The static eliminating process is not particularly limited as long as the static eliminating process includes a process of applying a static eliminating bias to the photoreceptor and can be selected appropriately according to different purposes; and the static eliminating process may be performed a static eliminating unit, for example.

-Recycling Unit and Recycling Step-

The recycling unit is not particularly limited as long as the recycling unit is a unit for causing the developing device to recycle the toner removed by the cleaning step, and can be selected appropriately according to different purposes; examples of the recycling unit include a known conveyance unit, etc.

The recycling step is not particularly limited as long as the recycling step includes recycling the toner removed by the cleaning step by using the developing device, and can be selected appropriately according to different purposes; and the recycling step may be performed by a recycling unit, for example.

Furthermore, one aspect of implementing a method of forming an image by an image forming apparatus will be described with reference to FIG. 2. Although a printer is illustrated as an example as an image forming apparatus according to the present embodiment, an image forming apparatus according to the present embodiment is not particularly limited to a printer as long as the image forming apparatus is capable of forming an image using toner. Examples of such an image forming apparatus include a copying machine, facsimile machine, multifunction machine, etc.

The image forming apparatus includes a paper feed part 210, a conveyance part 220, an imaging part 230, a transfer part 240, and a fixing device 250. The paper feed part 210 includes a paper feed cassette 211 loaded with paper P to be fed and a paper feed roller 212 for feeding paper P loaded in the paper feed cassette 211 one by one. The conveyance part 220 includes a roller 221 for conveying the paper P fed by the paper feed roller 212 in the direction of the transfer part 240, a pair of timing rollers 222 for holding the leading edge of the paper P conveyed by the roller 221 and feeding the paper to the transfer part 240 at a prescribed timing, and a paper discharge roller 223 for discharging the paper P on which the color toner image is fixed to a paper discharge tray 224.

The imaging part 230 is provided with an image forming unit 180Y that forms an image using a developer having yellow toner, an image forming unit 180C that uses a developer having cyan toner, an image forming unit 180M that uses a developer having magenta toner, an image forming unit 180K that uses a developer having black toner at predetermined intervals in order from left to right in the figure; and an exposure device 233.

The image forming units 180 (180Y, 180C, 180M, 180K) are provided so as to be rotated clockwise in the figure, and include photoreceptor drums 231 (231Y, 231C, 231M, 231K) on which an electrostatic latent image and a toner image are formed, chargers 232 (232Y, 232C, 232M, 232 K) for uniformly charging the surfaces of the photoreceptor drums 231 (231Y, 231C, 231M, 231K), and cleaners 236 (236Y, 236C, 236M, 236 K) for removing toner remaining on the surfaces of the photoreceptor drums 231 (231Y, 231C, 231M, 231K).

The image forming units 180 (180Y, 180C, 180M, 180K) also includes toner bottles 234 (234Y, 234C, 234M, 234K) for storing toners of respective colors and sub-hoppers 160 (160Y, 160C, 160M, 160K) for replenishing toners supplied from the respective toner bottles 234 (234Y, 234C, 234M, 234K). It should be noted that any image forming unit among the image forming units 180 (180Y, 180C, 180M, 180K) is referred to as an image forming unit.

The exposure device 233 reflects, based on image information, laser light L emitted from the light source 233*a* by polygon mirrors 233*b* (233*b*Y, 233*b*C, 233*b*M, 233*b*K) rotationally driven by a motor and applies the reflected laser light L to the respective photoreceptor drums 231.

The developer has a toner and a carrier. The 4 image forming units 180 (180Y, 180C, 180M, 180K) are virtually identical in mechanical construction, with only a different developer used in each.

Figure 2:
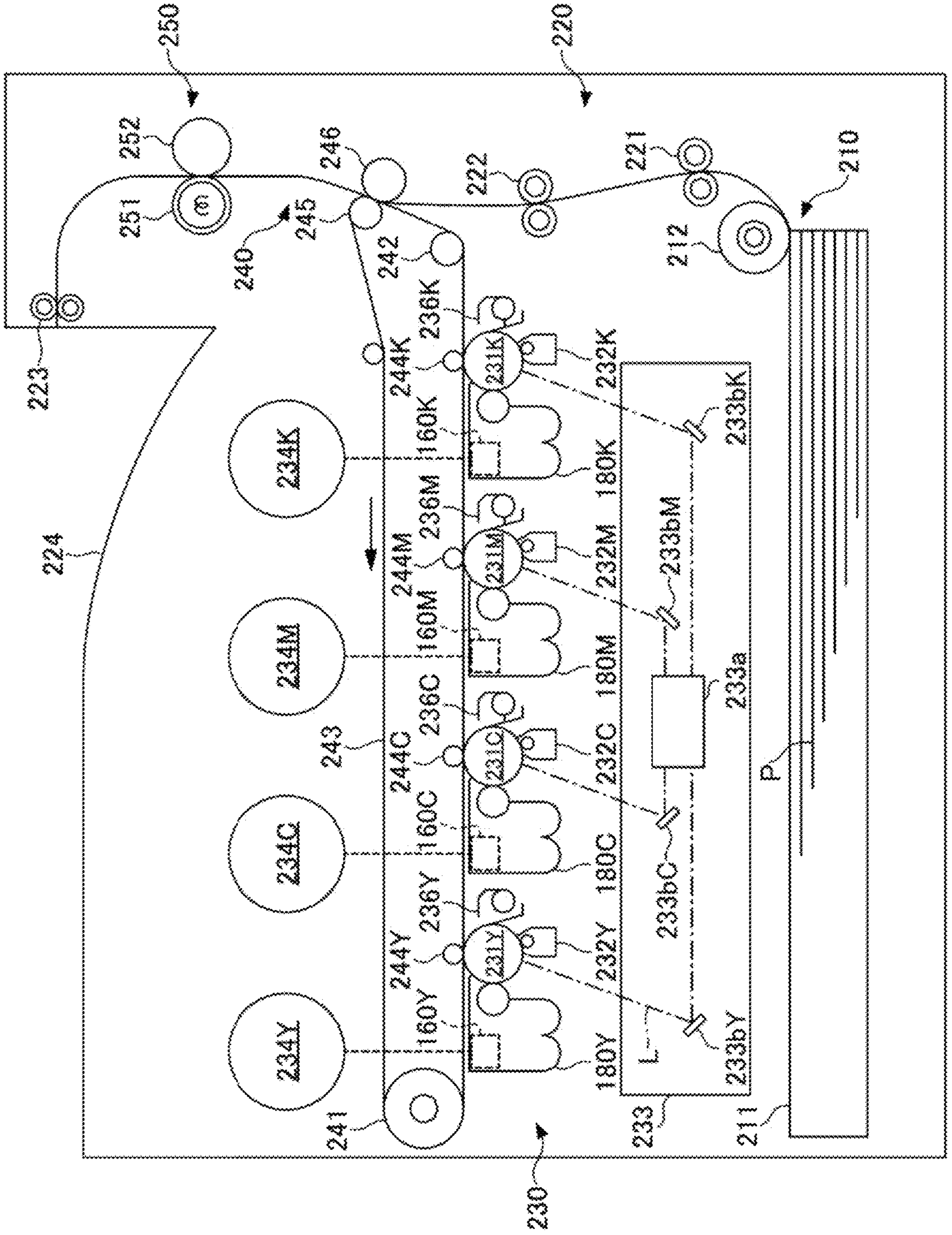
FIG. 2 is a schematic diagram illustrating an example of an image forming apparatus according to an embodiment.

The transfer part 240 includes a driving roller 241, a driven roller 242, and an intermediate transfer belt 243 that can rotate counterclockwise in FIG. 2 as the driving roller 241 is driven, respective primary transfer rollers 244 (244Y, 244C, 244M, 244K) provided opposite the photoreceptor drums 231 (231Y, 231C, 231M, 231K) across the intermediate transfer belt 243, and a secondary counterpart roller 245 and a secondary transfer roller 246 provided opposite the intermediate transfer belt 243 at the transfer position of the toner image to paper.

The fixing device 250 is provided with a fixing belt 251 that has an internal heater for heating paper P, and a pressure roller 252 that rotatably pressurizes the fixing belt 251 to form a nip. With this configuration, heat and pressure are applied to a color toner image on the paper P to fix the color toner image. The paper P on which the color toner image is fixed is discharged onto a paper discharge tray 224 by a paper discharge roller 223, and a series of image forming processes is completed.

EXAMPLES

Examples according to the embodiment of the present invention are described below, but the present invention is not in any way limited to these examples.

Production Example 1

<Production of Toner>

<<Production of Toner Matrix Particles A>>

-Synthesis of Crystalline Polyester-

In a 5-liter four-neck flask equipped with a nitrogen introduction tube, a dehydration tube, a stirrer and a thermocouple, 2300 g of 1,6-alkanediol, 2530 g of fumaric acid, 291 g of trimellitic anhydride, and 4.9 g of hydroquinone were added, and the mixture was allowed to react at 160° C. for 5 hours, and then the mixture was allowed to react by increasing a temperature to 200° C. for 1 hour, and the reaction was continued at 8.3 kPa for 1 hour to obtain [crystalline polyester 1].

-Synthesis of Non-Crystalline Polyester (Low-Molecular-Weight Polyester)-

In a 5-liter four-neck flask equipped with a nitrogen introduction tube, a dehydration tube, a stirrer and a thermocouple, 229 parts of bisphenol A ethylene oxide 2 mol adduct, 529 parts of bisphenol A propylene oxide 3 mol adduct, 208 parts of terephthalic acid, 46 parts of adipic acid and 2 parts of dibutyltin oxide were added, and the mixture was reacted at 230° C. for 7 hours under normal pressure, and then reacted for 4 hours under a reduced pressure of 10 to 15 mmHg. Subsequently, 44 parts of trimellitic anhydride were further added in a reaction vessel and the mixture was allowed to react at 180° C. for 2 hours under normal pressure to obtain [amorphous Polyester 1]. Here, the [amorphous polyester 1] corresponds to an unmodified polyester.

-Synthesis of Polyester Prepolymers-

In a reaction vessel equipped with a cooling tube, a stirrer and a nitrogen-introduction tube, 682 parts of bisphenol A ethylene oxide 2 mol adduct, 81 parts of bisphenol A propylene oxide 2 mol adduct, 283 parts of terephthalic acid, 22 parts of trimellitic anhydride and 2 parts of dibutyltin oxide were added and the mixture was allowed to react at 230° C. for 8 hours under atmospheric pressure, and then allowed to react for 5 hours under reduced pressure of 10 to 15 mmHg to obtain [intermediate polyester 1]. The [intermediate polyester 1] had a number-average molecular weight of Mn of 2100, a weight-average molecular weight of Mw of 9500, a glass transition temperature of Tg of 55° C., an acid value of 0.5 KOHmg/g, and a hydroxyl value of 51 KOHmg/g. Here, the [intermediate polyester 1] corresponds to an unmodified polyester.

Next, in a reaction vessel equipped with a cooling tube, a stirrer and a nitrogen introduction tube, 410 parts of the intermediate polyester 1, 89 parts of isophorone diisocyanate and 500 parts of ethyl acetate were added, and the mixture was allowed to react at 100° C. for 5 hours to obtain [prepolymer 1]. Here, the [prepolymer 1] is a modified polyester and corresponds to an [active hydrogen group-containing compound].

-Kechimine Synthesis-

In a reaction vessel equipped with a stirring rod and a thermometer, 170 parts of isophorone diamine and 75 parts of methyl ethyl ketone were loaded, and the mixture was allowed to react at 50° C. for 5 hours to obtain a [ketimine compound 1]. The amine value of ketimine compound 1 was 418. The [ketimine compound 1] is a polymer capable of reacting with active hydrogen group-containing compounds.

-Masterbatch Synthesis- 1200 parts of water, 540 parts of carbon black (Printex 35 manufactured by Degussa) [DBP oil absorption=42 mL/100 mg, pH=9.5] and 1200 parts of [amorphous polyester 1] were added and mixed in a Henschel mixer (made by Mitsui Mining), the mixture was kneaded for 30 minutes at 150° C. using two rolls, rolled and cooled, and pulverized in a pulperizer to obtain [masterbatch 1].

-Preparation of Oil Phase- 378 parts of [amorphous polyester 1], 110 parts of carnauba wax and 947 parts of ethyl acetate were charged into a container set with a stirring rod and a thermometer, and the temperature was raised to 80° C. under stirring, kept at 80° C. for 5 hours, and then cooled to 30° C. in 1 hour. Next, 500 parts of [masterbatch 1] and 500 parts of ethyl acetate were charged into a container and mixed for 1 hour to obtain a [raw material solution 1].

In addition, 1324 parts of the [raw material solution 1] were transferred to a container, and carbon black and wax were dispersed using a bead mill (Ultra Visco Mill, manufactured by Imex) under the conditions of feeding speed of 1 kg/h, disc circumferential speed of 6 m/s, 80 volume % filling of 0.5 mm zirconia beads, and 12 passes. Then, 1042.3 parts of 65% ethyl acetate solution of [amorphous polyester 1] were added and passed through a bead mill under the above conditions to obtain a [pigment-wax dispersion 1]. The solid content concentration (130° C., 30 minutes) of pigments and wax was 50%.

-Preparation of Crystalline Polyester Dispersion-

In a metal 2 L container, 100 g of [crystalline polyester 1] and 400 g of ethyl acetate were dissolved with heating at 75° C., and then rapidly cooled in an ice water bath at a rate of 27° C./min. To this solution, 500 mL of glass beads (Diameter: 3 mm) was added, and pulverized for 10 hours in a batch type sand mill (manufactured by Kanpe Hapio) to obtain a [crystalline polyester dispersion 1].

-Synthesis of Organic Fine Particle Emulsions- 683 parts of water, 11 parts of sodium salt of methacrylate ethylene oxide adduct sulfate (Eleminol RS-30: Sanyo Chemical Industries, Ltd.), 138 parts of styrene, 138 parts of methacrylic acid and 1 part of ammonium persulfate were charged into a reaction vessel equipped with a stirring rod and a thermometer, and the mixture was stirred at 400 rpm for 15 minutes to obtain a white emulsion. The white emulsion was heated to an internal temperature of 75° C. and allowed to react for 5 hours. In addition, 30 parts of 1% ammonium persulfate aqueous solution were added and the mixture was matured at 75° C. for 5 hours to obtain an aqueous dispersion of vinyl resin (Copolymers of sodium salts of styrene-methacrylic acid-methacrylate ethylene oxide adduct sulfate esters), which was called [fine particle dispersion 1]. The volume-average particle size measured by LA-920 for the [fine particle dispersion 1] was 0.14 μm. The [fine particle dispersion 1] was partially dried to isolate the resin component.

-Preparation of Water Phase-

A milky white liquid was obtained by mixing and stirring 990 parts of water, 83 parts of [fine particle dispersion 1], 37 parts of a 48.5% aqueous solution of sodium dodecyl diphenyl ether disulfonate (Eleminol MON-7: manufactured by Sanyo Chemical Industries) and 90 parts of ethyl acetate. This was defined as a [water phase 1].

-Emulsification/Desolvent- 664 parts of [pigment-wax dispersion 1], 109.4 parts of [prepolymer 1], 120 parts of [crystalline polyester dispersion 1], and 4.6 parts of [ketimine compound 1] were added into a container and mixed at 5,000 rpm for 1 minute with a TK homomixer (manufactured by Tokushu Kikai Kogyo Co.), then 1200 parts of [water phase 1] were added to the container and mixed for 60 seconds at 8,000 rpm with a TK homomixer to obtain [emulsified slurry 1].

The [emulsified slurry 1] was put into a container set with a stirrer and a thermometer, desolvated at 30° C. for 8 hours, and then matured at 45° C. for 4 hours to obtain [dispersed slurry 1].

-Cleaning, Heating, and Drying-

After 100 parts of the [dispersed slurry 1] were filtered under reduced pressure, the following procedure was performed.

(1): 100 parts of ion-exchanged water were added to a filter cake, mixed with a TK homomixer (10 minutes at 12,000 rpm) and then filtered.

(2): 100 parts of 10% sodium hydroxide aqueous solution were added to the filter cake of (1), mixed with a TK homomixer (30 minutes at 12,000 rpm), and then filtered under reduced pressure.

(3): 100 parts of 10% hydrochloric acid was added to the filter cake of (2), mixed with a TK homomixer (at 12,000 rpm for 10 minutes) and then filtered.

(4): 300 parts of ion-exchanged water were added to the filter cake of (3) and mixed with a TK homomixer (at 12,000 rpm for 10 minutes).

(5): The slurry of (4) was mixed with a TK homomixer (at 1000 rpm) and heated until the liquid temperature reached 40° C., and the liquid temperature was retained at 40° C. for 15 minutes.

(6): The slurry of (5) was cooled to 25° C.

(7): The slurry of (6) was filtered to obtain a [filter cake 1].

(8): The [filter cake 1] in (7) was dried at 35° C. for 48 hours in a circulating air dryer and sieved with mesh with a mesh opening of 75 μm to obtain [toner matrix particles A].

<<External Processing>>

With respect to 100 parts by mass of the [toner matrix particles A], 0.6 parts by mass of H 1303VP (average primary particle size 23 nm, manufactured by Clariant) as silica particles, and 1.0 parts by mass of titanium oxide (JMT-150IB, manufactured by TAYCA CORPORATION) with an average particle size of 20 nm were mixed in a Henschel mixer.

In the order of mixing, only silica particles were added to mix in the first step, and titanium oxide was added to mix in the second step. After mixing, the mixture was passed through a sieve with a mesh opening 500 μm to obtain a [toner 1].

Example 2

A [toner 2] was prepared in the same manner as in Example 1 except that the heating retention time was set to 30 minutes in the cleaning, heating and drying step of Example 1.

Example 3

A [toner 3] was prepared in the same manner as in Example 1, except that the heating retention time was set to 45 minutes in the cleaning, heating and drying step of Example 1.

Example 4

A [toner 4] was prepared in the same manner as in Example 1 except that the heat treatment temperature was set to 45° C. in the cleaning, heating and drying step of Example 1.

Example 5

A [toner 5] was prepared in the same manner as in Example 1, except that the heat treatment temperature was set to 45° C. and the heat retention time was set to 35 minutes in the cleaning, heating and drying step of Example 1.

Example 6

A [toner 6] was prepared in the same manner as in Example 1, except that the heat treatment temperature was set to 45° C. and the heat retention time was set to 25 minutes in the cleaning, heating and drying step of Example 1.

Example 7

A [toner 7] was prepared in the same manner as in Example 1, except that 5 parts by mass of a 10% aqueous solution of sodium sulfate was added in the water phase adjustment process of Example 1, and the heat treatment temperature was set to 45° C. and the heat retention time was set to 15 minutes in the cleaning, heating and drying step of Example 1.

Comparative Example 1

A [toner 8] was prepared in the same manner as in Example 1, except that the heat treatment temperature was set to 50° C. in the cleaning, heating and drying step of Example 1.

Comparative Example 2

A [toner 9] was prepared in the same manner as in Example 1, except that the heat treatment temperature was set to 35° C. in the cleaning, heating and drying step of Example 1.

Comparative Example 3

A [toner 10] was prepared in the same manner as in Example 1, except that no heat treatment was performed in the cleaning, heating, and drying step of Example 5.

<Carrier Preparation>

With respect to 100 parts by mass of toluene, 100 parts by mass of silicone resin (organostraight silicone), 5 parts by mass of γ-(2-aminoethyl) aminopropyltrimethoxysilane, and 10 parts by mass of carbon black were added and dispersed for 20 minutes with a homomixer to prepare a resin layer coating solution.

Using a fluidized-bed coating device, the resin layer coating solution prepared as described above was applied to the surface of 1,000 parts by mass of spherical magnetite particles with a volume-average particle size of 50 μm to prepare a [carrier].

<Developer Preparation>

Using a ball mill, 5 parts by mass of each [toner] and 95 parts by mass of the [carrier] were mixed to make each [developer].

Then, using each [toner] and each [developer] obtained, various characteristics were evaluated as follows. The results are illustrated in Table 1.

<Measurement of Void Diameter>

Each resulting toner was ruthenium-stained and observed by cross-sectional scanning electron microscopy. At that time, the imaging conditions in a scanning electron microscope (SEM) were as follows.

[Imaging Conditions]

Scanning electron microscope: SU-8230 (manufactured by Hitachi High Technologies)

Imaging magnification: 60,000×

Image: SE (L): secondary electron, BSE (reflected electron)

Acceleration voltage: 3.0 kV

Acceleration current: 1.0 μA

Probe current: Normal

Focus mode: UHR

WD: 8.0 mm

The captured secondary and reflected electron images were compared. In this comparison, the areas in the toner matrix particles that were observed black in the secondary electron image but not black (grayed) in the reflection electron image were determined to be voids. In addition, the outer circumference of each void was measured using image processing software (ImageJ), and the diameter of a perfect circle with the same circumference as the measured outer circumference was determined to be a void diameter Φ (nm). The average number of voids per toner (per toner matrix particle) with a void diameter of $300 \geq \Phi \geq 200$ was then determined. In addition, the average number of voids with a void diameter of $500 \geq \Phi \geq 200$ and the average number of voids with a void diameter of $\Phi > 500$ per toner (per toner matrix particle) were determined, respectively. To determine the average number of voids in each case, 10 toners were randomly selected.

<Measurement of BET Specific Surface Area>

A BET specific surface area of the toner matrix particles obtained in each case was measured using a fully automated specific surface area measuring device, Macsorb HM model-1201 (MOUNTECH).

<Measurement of Average Circularity>

The average circularity of the toner matrix particles obtained in each example was measured using a flow-type particle imaging device, FPIA-3000 (manufactured by Sysmex). The circularity was set as follows, as described above.

CIRCULARITY=(PERIMETER OF A CIRCLE OF THE SAME AREA AS THE PROJECTED AREA OF THE PARTICLE)/(PERIMETER OF THE PROJECTED IMAGE OF THE PARTICLE)

Specifically, the measurement was carried out as follows. With respect to 30 mL of ion-exchanged water, 2 mL of a desired surfactant and 0.05 g of the measured sample were charged and dispersed using a dispersive ultrasonic oscillator. During dispersion, the liquid was dispersed for 2 to 3 minutes to make a prescribed dispersion. Then, using the flow-type particle image measuring device described above, the dispersions were readjusted so that the concentration of the dispersions was approximately 5000 to 10,000 particles/μL, and measurements were performed. The measurement results were analyzed with data ranging from 2 μm to 200 μm in the toner circle equivalent diameter, and the average circularity of the toner was calculated.

<Transferability Assessment>

After running and outputting 100,000 image charts of 7% image area in monochromatic mode, the transfer rate was calculated from the relationship between the amount of input toner and the amount of waste toner:

TRANSFER RATE=100×(AMOUNT OF INPUT TONER-AMOUNT OF WASTE TONER)/(AMOUNT OF INPUT TONER)

The transfer rate of 90 or higher was determined as "EXCELLENT", the transfer rate of 75 or higher but less than 90 was determined as "GOOD", the transfer rate of 60 or higher but less than 75 was determined as "ALLOWABLE", and the transfer rate of less than 60 was determined as "UNUSABLE".

<Toner Replenishment Properties>

120 g of toner was filled in a 1,200 mL toner container, and the toner container was shaken to thoroughly mix the toner. The toner container was attached to a replenishment device with a transfer nozzle. The toner container was rotated and the replenishment device was operated under the following conditions to measure the amount of toner discharged from the replenishment device.

[Operating Conditions of Replenishment Device]

Toner container rotation speed: 100 rpm

Transfer screw pitch in transfer nozzle of the replenishment device: 12.5 mm

Transfer screw outer diameter: 10 mm

Transport screw shaft diameter: 4 mm

Transfer screw rotation speed: 500 rpm

Toner replenishment from the container body was evaluated according to the following evaluation criteria: "EXCELLENT", "GOOD", "ALLOWABLE", and "UNUSABLE". Of these, "EXCELLENT", "GOOD", and "ALLOWABLE" were determined acceptable, and "UNUSABLE" was determined unacceptable.

[Evaluation Criteria]

Excellent:

(When the toner container is continuously driven until the toner container can no longer discharge toner, the toner replenishment amount is maintained at a stable (constant) level of 0.4 g/sec or higher in the range of less than 70 g and 10 g or more of the toner remaining in the toner container.)

*The toner replenishment amount of 0.4 g/sec is a replenishment amount that is expected not to cause blurring of solid images (solid trackability) due to insufficient toner replenishment amount even if a full solid image is continuously fed on A4 sheets of paper.

*The range of 10 g or more of toner is based on consideration of the amount of toner adhering to the inner wall of the container.

Good:

(When the toner container is continuously driven until the toner container can no longer discharge toner, the toner replenishment amount is maintained at a constant level of less than 0.4 g/sec in the range of less than 70 g and more than 10 g of toner remaining in the toner container.)

*The toner replenishment amount is less than 0.4 g/sec but the toner replenishment amount is maintained at a stable (constant) level; thus, the bottom of the toner replenishment amount can be raised by, for example, increasing the rotation speed of the toner-containing container so that the toner replenishment amount can be stably and sufficiently replenished for solid tracking.

Allowable:

(When the toner container is continuously driven until the toner container can no longer discharge toner, and the remaining amount of toner in the toner container becomes less than 70 g, the toner is still discharged, but the toner replenishment amount is not constant and decreases with an inclination).

*Since the toner container discharges the toner, the replenishment does not become zero, but more complicated replenishment control is required to guarantee the solid trackability.

Unusable (Practically Unusable Level):

(When the toner container is continuously driven until the toner container can no longer discharge toner, but the discharge ceases when 70 g or more toner remains).

<Image Density>

After outputting solid images on 6000 sheets of paper made by Ricoh, the image density was measured by an X-Rite series measuring device (manufactured by X-Rite). Image output was performed independently for each of the four colors, and the average density was obtained. Measured values less than 1.2 were defined as "Unusable", values between 1.2 or more and less than 1.4 were defined as "Allowable", values between 1.4 or more and less than 1.8 were defined as "Good", and values between 1.8 or more and less than 2.2 were defined as "Excellent".

<Overall Judgment>

Based on the results of each evaluation item, the following criteria were used.

[Evaluation Criteria]

EXCELLENT: Three or more of the evaluation items were defined as "EXCELLENT".

GOOD: Two or more of the evaluation items were defined as "EXCELLENT" and no evaluation items were defined as "ALLOWABLE" or "UNUSABLE".

ALLOWABLE: Any one of the evaluation items was defined as "ALLOWABLE"

UNUSABLE: Any one of the evaluation items was defined as "UNUSABLE"

TABLE 1

| | | HEATING TEMPERATURE [° C.] | TIME [min] | SODIUM SULFATE AQUEOUS SOLUTION [PARTS BY MASS] | NUMBER OF VOIDS [PCS] 300 ≥ φ ≥ 200 | NUMBER OF VOIDS [PCS] 500 ≥ φ ≥ 200 | NUMBER OF VOIDS [PCS] φ > 500 | BET [m²/g] | CIRCULARITY [–] | EVALUATION REPLENISHMENT | EVALUATION TRANSFERABILITY | EVALUATION IMAGE DENSITY | EVALUATION OVERALL JUDGMENT |
|---|---|---|---|---|---|---|---|---|---|---|---|---|---|
| EXAMPLE 1 | TONER 1 | 40 | 15 | 0 | 5 | 6 | 0 | 1.7 | 0.982 | EXCELLENT | EXCELLENT | EXCELLENT | EXCELLENT |
| EXAMPLE 2 | TONER 2 | 40 | 30 | 0 | 3 | 6 | 0 | 1.7 | 0.982 | EXCELLENT | GOOD | EXCELLENT | GOOD |

TABLE 1-continued

| | | HEATING TEMPERATURE [° C.] | TIME [min] | SODIUM SULFATE AQUEOUS SOLUTION [PARTS BY MASS] | NUMBER OF VOIDS [PCS] 300 ≥ φ ≥ 200 | NUMBER OF VOIDS [PCS] 500 ≥ φ ≥ 200 | NUMBER OF VOIDS [PCS] φ > 500 | BET [$m^2$/g] | CIRCULARITY [−] | EVALUATION REPLENISHMENT | EVALUATION TRANSFERABILITY | EVALUATION IMAGE DENSITY | EVALUATION OVERALL JUDGMENT |
|---|---|---|---|---|---|---|---|---|---|---|---|---|---|
| EXAMPLE 3 | TONER 3 | 40 | 45 | 0 | 2 | 7 | 1 | 1.5 | 0.982 | GOOD | GOOD | GOOD | GOOD |
| EXAMPLE 4 | TONER 4 | 45 | 15 | 0 | 8 | 10 | 1 | 1.5 | 0.982 | GOOD | EXCELLENT | EXCELLENT | GOOD |
| EXAMPLE 5 | TONER 5 | 45 | 35 | 0 | 1 | 9 | 2 | 1.3 | 0.981 | GOOD | GOOD | GOOD | GOOD |
| EXAMPLE 6 | TONER 6 | 45 | 25 | 0 | 5 | 10 | 2 | 1.4 | 0.981 | EXCELLENT | GOOD | EXCELLENT | GOOD |
| EXAMPLE 7 | TONER 7 | 45 | 15 | 5 | 8 | 9 | 0 | 1.9 | 0.973 | GOOD | GOOD | EXCELLENT | GOOD |
| COMPARATIVE EXAMPLE 1 | TONER 8 | 50 | 15 | 0 | 2 | 13 | 2 | 1.4 | 0.982 | ALLOWABLE | ALLOWABLE | ALLOWABLE | ALLOWABLE |
| COMPARATIVE EXAMPLE 2 | TONER 9 | 35 | 15 | 0 | 1 | 4 | 1 | 1.8 | 0.981 | ALLOWABLE | ALLOWABLE | GOOD | ALLOWABLE |
| COMPARATIVE EXAMPLE 3 | TONER 10 | NO HEATING | | 0 | 1 | 1 | 0 | 2.0 | 0.982 | UNUSABLE | UNUSABLE | GOOD | UNUSABLE |

Table 1 indicates that Example 1 to 7 illustrated excellent performance in terms of any of replenishment properties, transferability, and image density. Comparative Example 1, which had a large number of voids with a void diameter $\Phi$ of 500 nm≥$\Phi$≥200 nm, exhibited slightly reduced replenishment properties, which may be probably due to excessive flowability. In Comparative Example 1, toner aggregation was likely to occur, and the transferability was slightly reduced, and the image density decreased due to image unevenness. On the other hand, Comparative Example 2, which had fewer voids with a void diameter $\Phi$ of 500 nm≥$\Phi$≥200 nm, exhibited slightly reduced replenishment properties, which may be due to the lack of flowability. Comparative Example 3, which had even fewer voids than Comparative Example 2, exhibited even worse toner replenishment properties.

Advantageous Effect of the Invention

According to one aspect of an embodiment of the present invention, a toner having excellent transferability and excellent replenishment properties, and capable of forming good images can be provided.

The present disclosures non-exhaustively include the subject matter set out in the following clauses:

<Clause 1>

A toner comprising:

toner matrix particles containing resin and wax; and an external additive, wherein an average number of voids per toner is 5 or more and 10 or less per toner with a void diameter $\Phi$ (nm) of voids in the toner matrix particles being 500≥$\Phi$≥200, as measured based on cross-sectional observation by a scanning electron microscope (SEM).

<Clause 2>

The toner according to clause 1, wherein the average number of voids per toner is 5 or more and 10 or less per toner with the void diameter $\Phi$ (nm) of voids in the toner matrix particles being 300≥$\Phi$≥200.

<Clause 3>

The toner according to clause 1 or 2, wherein the average number of voids per toner is less than 1 per toner with the void diameter $\Phi$ (nm) of voids in the toner matrix particles being $\Phi$>500.

<Clause 4>

The toner according to any one of clauses 1 to 3, wherein a BET specific surface area of the toner matrix particles is 1.4 to 2.0 $m^2$/g.

<Clause 5>

The toner according to any one of clauses 1 to 4, wherein average circularity of the toner matrix particles is 0.974 to 0.984.

<Clause 6>

A toner storage unit comprising the toner according to any one of clauses 1 to 5.

<Clause 7>

An image forming apparatus comprising the toner storage unit according to any one of clauses 1 to 6.

<Clause 8>

An image forming method comprising:

a step of forming an electrostatic latent image on an electrostatic latent image carrier; and a step of developing the electrostatic latent image using the toner according to any one of clauses 1 to 5 to form a toner image that is a visible image.

<Clause 9>

A toner production method, comprising:

a step of obtaining toner matrix particles by an emulsion aggregation method or a dissolution suspension method, wherein an average number of voids per toner is 5 or more and 10 or less per toner with a void diameter $\Phi$ (nm) of voids in the toner matrix particles being 500≥$\Phi$≥200, as measured based on cross-sectional observation by a scanning electron microscope (SEM).

What is claimed is:

1. A toner, comprising:

toner matrix particles containing resin and wax; and an external additive;

wherein voids are formed inside the toner matrix particles; and wherein an average number of voids per toner is 5 or more and 10 or less per toner, with a void diameter Φ (nm) of voids in the toner matrix particles being $500 \geq \Phi \geq 200$, as measured based on cross-sectional observation by a scanning electron microscope (SEM).

2. The toner according to claim 1, wherein the average number of voids per toner is 5 or more and 10 or less per toner with the void diameter Φ (nm) of voids in the toner matrix particles being $300 \geq \Phi \geq 200$.

3. The toner according to claim 1, further comprising the average number of voids per toner, with the void diameter Φ (nm) exceeding $\Phi > 500$, is less than 1 per toner.

4. The toner according to claim 1, wherein a BET specific surface area of the toner matrix particles is 1.4 to 2.0 $m^2/g$.

5. The toner according to claim 1, wherein average circularity of the toner matrix particles is 0.974 to 0.984.

6. A toner storage unit, comprising the toner according to claim 1.

7. An image forming apparatus, comprising the toner storage unit according to claim 6.

8. An image forming method, comprising:

forming an electrostatic latent image on an electrostatic latent image carrier; and developing the electrostatic latent image using the toner according to claim 1 to form a toner image that is a visible image.

9. A toner production method, comprising:

obtaining toner matrix particles by an emulsion aggregation method or a dissolution suspension method;

wherein voids are formed inside the toner matrix particles; and wherein an average number of voids per toner is 5 or more and 10 or less per toner, with a void diameter Φ (nm) of voids in the toner matrix particles being $500 \geq \Phi \geq 200$, as measured based on cross-sectional observation by a scanning electron microscope (SEM).

* * * * *